(12) United States Patent
Shinoda et al.

(10) Patent No.: US 8,029,680 B2
(45) Date of Patent: Oct. 4, 2011

(54) FILTRATION APPARATUS AND FILTRATION METHOD

(75) Inventors: Takeshi Shinoda, Fukuoka (JP); Sakiyori Mononobe, Chiba (JP)

(73) Assignee: Kyushu University, National University Corporation, Fukuoka (JP)

( * ) Notice: Subject to any disclaimer, the term of this patent is extended or adjusted under 35 U.S.C. 154(b) by 51 days.

(21) Appl. No.: 12/675,406

(22) PCT Filed: Aug. 25, 2008

(86) PCT No.: PCT/JP2008/002286
§ 371 (c)(1), (2), (4) Date: Feb. 26, 2010

(87) PCT Pub. No.: WO2009/028163
PCT Pub. Date: Mar. 5, 2009

(65) Prior Publication Data
US 2010/0300987 A1    Dec. 2, 2010

(30) Foreign Application Priority Data
Aug. 30, 2007    (JP) ................................ 2007-224898

(51) Int. Cl.
*B01D 37/02* (2006.01)
*B01D 24/02* (2006.01)
*C02F 1/00* (2006.01)

(52) U.S. Cl. ......... 210/777; 210/778; 210/290; 210/193

(58) Field of Classification Search ........................ None
See application file for complete search history.

(56) References Cited

U.S. PATENT DOCUMENTS
2010/0300987 A1 * 12/2010 Shinoda et al. ............... 210/777

FOREIGN PATENT DOCUMENTS
| EP | 2184096 A1 * | 5/2010 |
| JP | 52-090871 A | 7/1977 |
| JP | 56-060400 A | 5/1981 |
| JP | 3-038117 U | 4/1991 |
| JP | 2002-336613 A | 11/2002 |
| JP | 2006-102283 A | 4/2006 |
| JP | 2008-018349 A | 1/2008 |

OTHER PUBLICATIONS
International Search Report (PCT/ISA/210) for PCT/JP2008/002286, dated Sep. 30, 2009, 5 pages.
International Preliminary Examination Report (PCT/ISA/237) for PCT/JP2008/002286, dated Sep. 30, 2009, 6 pages.

* cited by examiner

*Primary Examiner* — Robert James Popovics
(74) *Attorney, Agent, or Firm* — Sughrue Mion, PLLC

(57) ABSTRACT

A filtration apparatus and a filtration method are provided. The filtration apparatus includes a filter medium, a first filter layer of a first filter aid disposed on an upstream side of the filter medium, and a second filter layer of a second filter aid disposed on an upstream side of the first filter layer. The first filter aid has a particle size distribution primarily including coarse particles, a representative particle diameter of which is smaller than a representative dimension of openings in the filter medium. The first aid forms bridges over the openings. The second filter aid has a particle size distribution primarily including fine particles, which are smaller than the first filter aid and which themselves cannot form bridges over the openings. The openings of the filter medium and the particles of the second filter layer are adjusted in size by bridging phenomenon of the first filter aid.

11 Claims, 9 Drawing Sheets

FILTRATION APPARATUS AND FILTRATION METHOD

TECHNICAL FIELD

The present invention relates to a filtration apparatus and a filtration method which can perform sterilization without using a chemical agent and, particularly, to a filtration apparatus and a filtration method which can sterilize ship's ballast water or the like to a level that meets an international environmental standard.

BACKGROUND ART

Conventionally, a ship carries seawater, which is drawn up by a pump or the like, as ballast water in a tank provided in the bottom of the ship and, when arrived at its destination, discharges the ballast water to the outside while loading and unloading cargos. This is because, when the ship does not carry any cargos or when a quantity of cargos on the ship is a small, a draft line is lowered which makes it unable to keep its balance. An overtime in pumping-up and discharging operations leads to an increase in transportation cost. Therefore, in order to finish the operation within the loading and unloading time of the cargos, the pumping-up and discharging operations are generally carried out at high speeds such as several hundreds of tons per hour to several thousands of tons per hour.

Usually, a marine area in which the ballast water is taken in and a marine area in which the ballast water is discharged are different. Depending on the marine area in which the seawater is taken in, harmful plankton or bacteria may be mixed therein, and if it is discharged in the coastal area or inside a harbor at the destination, it would mean that the harmful plankton or the bacteria are artificially brought in from the intake marine area to the discharging marine area. In some circumstances, they may proliferate abnormally in the discharged marine area and destroy the ecosystem, and may cause shellfish poisoning or a red tide to cause marine pollution, which would inflict a serious blow to the fishing industry. In fact, such cases are actually being reported. Further, they can harm even public health.

In order to prevent such harmful plankton or bacteria from being transported in accordance with the movement of the ship, in February 2004, the International Maritime Organization (IMO) adopted an International Convention for the Control and Management of Ships' Ballast Water and Sediments. In this convention, a strict discharge standard on the ballast water is provided, which is referred to as the D2 ballast water discharge standard, according to which dischargeable amounts are regulated as less than 10 individuals/ton with respect to the number of plankton having a size of more than 50 μm in the ballast water of 1 ton, less than 10 individuals/1 ml with respect to the number of plankton of 10 μm to 50 μm, and less than 250 cfu (colony forming unit)/100 ml with respect to *Escherichia coli*. Therefore, according to this discharge standard, microorganisms ranging from large-sized plankton of more than 50 μm to small bacteria of about 1μ are required to be removed simultaneously and almost entirely; and also, vast amount of ballast water is required be treated in a short time.

At present, in countries such as Australia and the U.S., this strict discharge standard is being implemented in advance. Thus, most ships heading for these countries carry out ballast water exchange in a coastal area such as an area near a harbor in order to meet this strict discharge standard. That is, before calling at the harbor, the ballast water that has been carried onboard the ship is exchanged with clean and non-problematic oceanic water (reballast method).

However, when exchanging the ballast water, balance keeping of a hull of the ship becomes a problem, which may induce a capsizing accident due to a procedural error in the exchanging operation. Thus, ensuring safety upon the exchanging operation is regarded as an issue. Besides, the exchange of the ballast water does not essentially solve the problem. Moreover, the standard itself is moving in a stricter direction, like in countries such as Australia and the U.S., it is being considered to set stricter criteria.

So far reported ballast water treatment apparatuses under development are centered on chemical treatment methods in which a medical treatment with a chemical agent, such as chlorine, or ozone is used to carry out disinfection or to eradicate plankton and bacteria, following the G9 standard which is based on a chemical approach. That is, under the current situation, reliance on the chemical treatment has been inevitable in order to clear the D2 ballast water discharge standard. Here, in the present description, the term "sterilization" means removing microorganisms such as plankton and bacteria to a target level.

As described above, the taking in and discharging operations of the ballast water are carried out while loading and unloading operations. Thus, if the ballast water is disinfected in accordance with the G9 standard, the ballast water treated with a chemical agent would be discharged in a large quantity into the harbor, in which case the chemical agent may give an extensive influence to the living creatures in the harbor and destroy the ecosystem. Therefore, there are built up expectations on a method which complies with the G8 standard relating to apparatuses and which carries out sterilization or disinfection using a physical treatment.

Filtration is a typical physical treatment. As means for filtration, a strain filtering phenomenon in which a filter medium, such as a strainer, catches solid particles that are larger than the voids (openings) formed therein, a depth filtering phenomenon in which voids formed in sterically layered cakes, sands and the like catch solid particles, and a cake filtering phenomenon in which surfaces of cakes, which grow in the course of filtration, separate large solid particles and allow only clean water through the cakes for the filtration, are mainly utilized.

In order to obtain clean water by filtering out even small bacteria of about 1μ, the eyes of the filter medium need to be small. Hence, a clogging occurs in a short time. For filtration in this case, it can be considered to utilize the cake filtering phenomenon described above, however, since the pressure loss (fluid resistance) becomes high immediately, it difficult to sterilize the ballast water flowing at a flow rate of several hundreds of tons/hour or several thousands of tons/hour. Accordingly, the chemical agent treatment described above, a heat treatment or an electrical treatment has been indispensable.

For example, when the ballast water is thermally treated at a temperature of about 60° or higher, there can be produced an environment which is unsuitable for *Escherichia coli* and the like to survive (heat treatment method). As specific methods, it can be considered to introduce heated engine cooling water into a tank, or to install a heat exchanger in a ballast water piping system. However, it cannot be said that these methods can reliably carry out disinfection and, besides, energy efficiency is not good. That is, large amount of heat and cost are required for disinfection. Further, carrying the hot water onboard affects the cargos, and an influence of the discharge of the hot water to marine creatures is also a concern.

Other methods than the heat disinfection are also being proposed, such as disinfection using ozone or mixture of ozone and steam (ozone method), disinfection by electrically destroying microorganisms using a high voltage pulse or the like, disinfection using ultraviolet rays or a photocatalyst (ultraviolet method), an electrochemical method, etc. However, neither of the proposals are practically satisfactory.

Also, as a composite method combining the above methods, there is proposed a method in which a filtration with a filtration medium pre-coated with a filter aid is combined with a disinfection using a heat treatment or an electric treatment (see, e.g., Patent Document 1). In this method, the filter aid forms a thin film on a surface of the filter medium, and since the filtered out microorganisms gather on this layer, heat energy or electric energy is applied to the gathered region to effectively carry out the disinfection. However, this is still difficult to treat a large amount of ballast water, and is difficult to say that it is practical also in view of cost.

There are types of filter medium, some aiming at microfiltration capable of filtering out suspended solids of 100 μm or less, and some aiming at general filtration for filtering out larger sizes. A sintered filter is used for microfiltration, whereas a spring filter is used for general filtration. The spring filter makes it possible to relatively lower a pressure loss. Further, when the filter medium is pre-coated with the filter aid, filtration utilizing a cake filtering phenomenon becomes possible. As a filtration apparatus of this type, there is known a filter in which pre-coat aids are layered on the filter medium sequentially in such order as they increase in the particle diameter thereof (see Patent Document 3).

A coil of the spring filter is configured such that protrusions are provided at given intervals on a spiral side face of the coil so that the gaps of the coil have a constant value (see, e.g., Patent Document 2). However, in order to remove small bacteria, these gaps need to be considerably narrow, which inevitably increases fluid resistance. When the gaps of the coil are widened, the filter aid becomes smaller and, thus, flows away through the gaps.

Patent Document 1: JP 2006-102283 A
Patent Document 2: JP 52-90871 A
Patent Document 3: JP 3-38117 U

DISCLOSURE OF THE INVENTION

Problems to be Solved by the Invention

As explained above, in order to treat the ballast water to the level of the D2 ballast water discharge standard, currently, the only way to clear this standard has been a chemical treatment based on the G9. However, this may give a large influence on the marine creatures in the coastal area and may destroy the ecosystem. To the contrary, such influence can be avoided if sterilization is carried out using a physical treatment, however, a filtration apparatus and a filtration method of practical use have not been proposed at present.

According to a filtration apparatus and a filtration method of Patent Document 1, using the fact that microorganisms exist collectively in the precoat layer, heat energy or electric energy is efficiently applied. However, in this filtration apparatus and the filtration method, a clogging is likely to occur due to the precoat layer, which makes it difficult to treat a large quantity of ballast water. Further, considering the configuration which requires electric or heat energy supply, equipments are complex, and is difficult to say that it is of practical use also in view of cost.

In this respect, the spring filter like the one of Patent Document 2 is practical from the viewpoint of cost. However, with use of the spring filter, coarse particles such as plankton exceeding 100 μm can be filtered out, but it is difficult to carry out a filtration that achieves the D2 standard. When trying to remove small bacteria of about 1μ, the pressure loss increases, which makes it substantially impossible to treat at a flow rate of hundreds of tons or thousands of tons per hour. When the gaps of the spring filter are spread accordingly, however, sterilization cannot be carried out.

Therefore, it can be considered to pre-coat the spring filter as in Patent Document 3 to filter out also the small bacteria, however, in this case also, a large quantity of water cannot be treated. If the gaps are widened simply in order to allow a large quantity of water to flow, small-sized filter aids flows away through the eyes (gaps) of the spring filter and cannot be held on the spring filter, which makes a continuous filtration inoperable. As described here, the filtration using the spring filter and the treatment of large quantity of the ballast water at high speeds have mutually contradictory relationship.

At present, there have been no filtration apparatus and filtration method that are practical, do not destroy environment such as ecosystem, and can treat the ballast water to the level of the D2 ballast water discharge standard using a physical treatment. This is not only in the case in which raw water (water to be treated) is the ballast water. That is, this similarly applies as far as there is a strict discharge standard and where large amount of water is required to be treated in a short time.

Accordingly, it is an object of the present invention to provide a filtration apparatus and a filtration method which can treat a large quantity of flow in a short time and can sterilize raw water to a high level using only a physical treatment.

A filtration apparatus according to the present invention includes a filter medium which filters raw water through openings, a first filter layer of a first filter aid disposed on an upstream side of the filter medium, and a second filter layer of a second filter aid disposed on an upstream side of the first filter layer. The filtration apparatus causes the raw water to flow from a side of the second filter layer to the filter medium to carry out a filtration, and is primarily characterized in that the first filter aid has a particle size distribution primarily including coarse particles, a representative particle diameter of which is smaller than a representative dimension of the openings, wherein, due to a flow during a water transfer, the particles are aggregated at the openings to cover and form bridges over said openings with multiple pieces, whereas the second filter aid has a particle size distribution primarily including fine particles, which are smaller than the first filter aid and which themselves cannot form bridges over the openings, and in that the openings of the filter medium and the particles of the second filter layer are adjusted in size by the first filter layer, which is held by the filter medium due to bridging phenomenon.

A filtration method according to the present invention includes disposing a first filter layer of a first filter aid on an upstream side of a filter medium which is formed with openings, disposing a second filter layer of a second filter aid on an upstream side of the first filter layer, and carrying out a filtration by causing raw water to flow from a side of the second filter layer to the filter medium. The filtration method is primarily characterized in that, the disposing the first filter layer comprises selecting the first filter aid having a particle size distribution primarily including coarse particles, a representative particle diameter of which is smaller than a representative dimension of the openings, wherein, due to a flow during a water transfer, the particles are aggregated at the openings to cover and form bridges over said openings with multiple pieces, whereas the disposing the second filter layer comprises selecting the second filter aid having a particle size distribution primarily including fine particles, which are smaller than the first filter aid and which themselves cannot form bridges over the openings, and in that the method includes holding the first filter layer on the filter medium due to bridging phenomenon of the first filter aid, and adjusting the openings of the filter medium and the particles of the second filter layer in size by the first filter layer.

Advantageous Effect of the Invention

According to a filtration apparatus and a filtration method of the present invention, a large amount of raw water can be sterilized at a high level of about 99% only with a physical treatment, and at the same time, it is possible to realize a filtration apparatus that can filter large amount of raw water in a short time and meets the D2 ballast water discharge standard. Both microfiltration and prevention of clogging can be achieved at the same time. An interval time for backwashing is lengthened to about 10 times as compared with a conventional one, thereby enabling a prolonged continuous operation. Further, although it has been believed that there is a limit to reduce the particle diameter of the pre-coating filter aid from the viewpoint of preventing the flowing away, the particle diameter can be reduced beyond this conventional limit. When compared with other types, it is extremely inexpensive in terms of cost. Equipments are reliable, practically applicable, simplified, and can be made compact.

EXPLANATION OF REFERENCE NUMERALS

Figure 1:
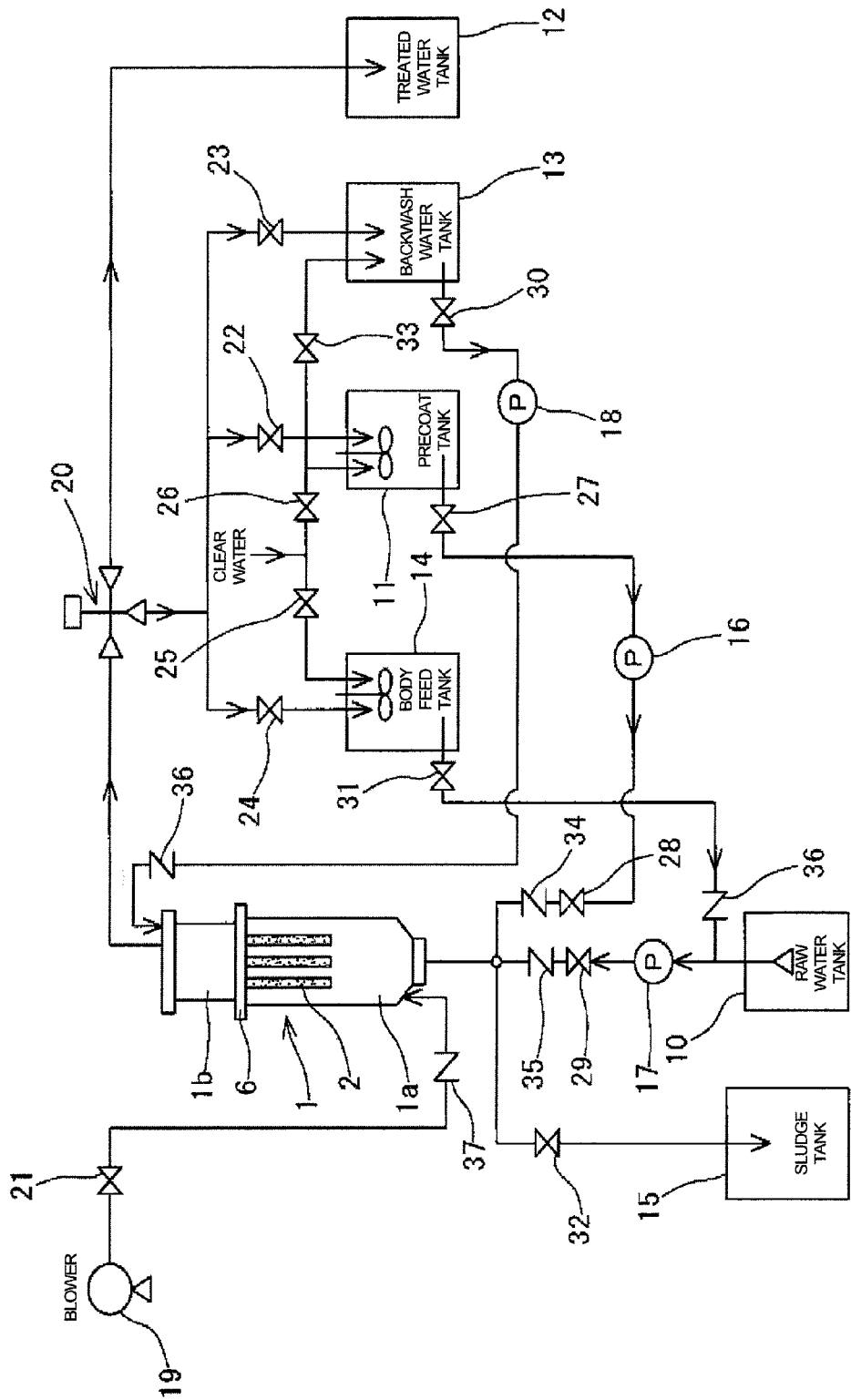
FIG. 1 is an explanatory diagram of a filtration apparatus according to an embodiment 1 of the present invention.

1: Filter Tank
1a: Raw Water Chamber
1b: Treated Water Chamber
2: Spring Filter
3: Coil Spring
3a: Protrusion
3b: Through Opening
4a: Cap Member
4b: Fixing Member
4c: Engagement Piece
5: Core Member
5a: Engagement Groove
5b: Cut
6: Partition Plate
10: Raw Water Tank
11: Precoat Tank
12: Treated Water Tank
13: Backwash Water Tank
14: Body Feed Tank
15: Sludge Tank
16, 17, 18: Pump
19: Blower
20: Three-Way Valve
21: Gas valve
22, 23, 24, 25, 26, 27, 28, 29, 30, 31, 32, 33: Valve
34, 35, 36, 37: Check Valve
41, 42, 43: Filter Aid
44: Body Feed Filter Aid
46: Fine Particle

BEST MODE FOR CARRYING OUT THE INVENTION

A first illustrative embodiment of the present invention provides a filtration apparatus including a filter medium which filters raw water through openings, a first filter layer of a first filter aid disposed on an upstream side of the filter medium, and a second filter layer of a second filter aid disposed on an upstream side of the first filter layer. The filtration apparatus causes the raw water to flow from a side of the second filter layer to the filter medium to carry out a filtration. The filtration apparatus is characterized in that the first filter aid has a particle size distribution primarily including coarse particles, a representative particle diameter of which is smaller than a representative dimension of the openings, wherein, due to a flow during a water transfer, the particles are aggregated at the openings to cover and form bridges over said openings with multiple pieces, whereas the second filter aid has a particle size distribution primarily including fine particles, which are smaller than the first filter aid and which themselves cannot form bridges over the openings, and in that the openings of the filter medium and the particles of the second filter layer are adjusted in size by the first filter layer, which is held by the filter medium due to bridging phenomenon.

According to this configuration, the bridges of the first filter aid are formed at the openings of the filter medium, whereby the fine second filter aid which itself cannot form bridges at the openings can be held on the filter medium. Since the size adjustment (eye adjustment) of the second filter aid and the filter medium is performed by the first filter aid, a large quantity of raw water can be sterilized to a high level only with the physical treatment and, at the same time, a large quantity of raw water can be filtered in a short time. Both microfiltration and prevention of clogging can be achieved at the same time. A limit of the particle diameter of the first filter aid in respect to the prevention of the flowing away can be removed. Backwash itself is also easy and the filter aid used can be reused. Backwashing itself is easy, and the used filter aid can be reused. When compared with other types, it is extremely inexpensive in terms of cost. Equipments are reliable, practically applicable, simplified, and can be made compact.

A second illustrative embodiment of the present invention is dependent on the first illustrative embodiment, and provides the filtration apparatus characterized in that, given that the filter medium has the openings having the representative dimension d, the first filter aid has the representative particle diameter defined as approximately (0.12 to 0.25)×d in accordance with a configuration of the openings.

According to this configuration, the first filter aid has the representative particle diameter defined as approximately (0.12 to 0.25)×d in accordance with a configuration of the openings. Therefore, the bridges of the first filter aid can be formed in accordance with the openings of the filter medium, whereby the fine second filter aid which itself cannot form bridges at the openings can be held on the filter medium. Since the eye adjustment of the second filter aid and the filter medium is performed by the first filter aid, a large quantity of raw water can be sterilized to a high level only with the physical treatment and, at the same time, a large quantity of raw water can be filtered in a short time. The limit of the particle diameter of the first filter aid in respect to the prevention of the flowing away can be removed. The first filter aid itself also contributes to the filtration.

A third illustrative embodiment of the present invention is dependent on the first or second illustrative embodiment, and provides the filtration apparatus characterized in that, on an upstream side of the second filter layer, a third filter layer of a third filter aid having a larger particle diameter than the second filter aid is provided, wherein an increase in a pressure loss in the course of filtration through the second filter layer is suppressed by the third filter layer.

According to this configuration, the third filter aid of the third filter layer filters out large solid particles, e.g., plankton or the like, from the raw water so as to prevent the second filter layer of the fine second filter aid from being clogged, whereby an increase in the pressure loss in the entire filtration apparatus is suppressed, and deterioration of the filtering function can be prevented.

A fourth illustrative embodiment of the present invention is dependent on the second illustrative embodiment, and provides the filtration apparatus characterized in that the representative dimension d of the openings is 90 μm or larger.

According to this configuration, an increase in the pressure loss can be suppressed, and deterioration of filtering function, which is caused when the eyes of the filter medium are excessively wide, can be prevented. A large quantity of raw water can be sterilized to a high level of about 99% only with the physical treatment and, at the same time, a large quantity of raw water can be filtered in a short time, whereby a filter apparatus that meets the D2 ballast water discharge standard can be realized. An interval time for backwashing is lengthened to about 10 times as compared with a conventional one, thereby enabling a prolonged continuous operation.

A fifth illustrative embodiment of the present invention is dependent on the second illustrative embodiment, and provides the filtration apparatus characterized in that, if the openings are slits, and given that the representative dimension d is a gap in each of said slits, the representative particle diameter of the first filter aid has a particle diameter of approximately (0.20 to 0.25)×d.

According to this configuration, the first filter aid has the representative particle diameter defined as approximately (0.20 to 0.25)×d in accordance with of the configuration of the slits of the filter medium. Therefore, the bridges of the first filter aid can be formed in accordance with the openings of the filter medium such as a spring filter, whereby the fine second filter aid which itself cannot form bridges at the openings can be held on the filter medium. Since the eye adjustment of the second filter aid and the filter medium is performed by the first filter aid, a large quantity of raw water can be sterilized to a high level only with the physical treatment and, at the same time, a large quantity of raw water can be filtered in a short time. The limit of the particle diameter of the first filter aid in respect to the prevention of the flowing away can be removed. The first filter aid itself also contributes to the filtration.

A sixth illustrative embodiment of the present invention is dependent on the first illustrative embodiment, and provides the filtration apparatus characterized in that, on an upstream side of the second filter layer, a body feed layer of a body feed filter aid is provided, and in that an increase in a pressure loss in the entire filtration apparatus is suppressed by said body feed layer.

This configuration prevents a formation of filter cakes on the upstream side of the second filter layer, which otherwise would cause a clogging and a loss of capability to filter a large quantity of raw water in a short time, thereby enabling a prolonged continuous operation.

A seventh illustrative embodiment of the present invention is dependent on the third illustrative embodiment, and provides the filtration apparatus characterized in that, on an upstream side of the third filter layer, or, when a filter layer of a filter aid, particles of which increase in size sequentially, is further disposed on the third filter layer, on an upstream of said filter layer on the most upstream side, a body feed layer of a body feed filter aid is disposed, and in that an increase in a pressure loss in the entire filtration apparatus is suppressed by said body feed layer.

According to this configuration, more filter layers are disposed further on the upstream side of the third filter layer. Thus, the possibility of clogging in the filter layers can further be dispersed, thereby enabling a prolonged continuous operation.

An eighth illustrative embodiment of the present invention is dependent on the seventh illustrative embodiment, and provides the filtration apparatus characterized in that the filter medium is a spring filter including coil parts, the openings are gaps between the coil parts wherein the coil parts are wound, and in that the filter apparatus includes a precoat aid supply passage operable to supply, for precoating, one of the first to third filter aids and the filter aid of the further layer, respectively, and a body feed aid supply passage which supplies the body feed filter aid into the raw water.

According to this configuration, using the spring filter, the precoat aid supply passage and the body feed aid supply passage, a large quantity of raw water can be sterilized to a high level of about 99% only with the physical treatment and, at the same time, a large quantity of raw water can be filtered in a short time. An interval time for backwashing is lengthened to about 10 times as compared with a conventional one, thereby enabling a prolonged continuous operation. A limit of the particle diameter of the first filter aid in respect to the prevention of the flowing away can be removed. Backwashing itself is easy, and the used filter aid can be reused. When compared with other types, it is extremely inexpensive in terms of cost. Equipments are reliable, practically applicable, simplified, and can be made compact.

A ninth illustrative embodiment of the present invention is dependent on the eighth illustrative embodiment, and provides the filtration apparatus characterized in that each of the gaps is 60 μm to 120 μm, the first filter aid is a diatomaceous earth having the representative particle diameter of approximately 20 μm to 40 μm, the second filter aid is a diatomaceous earth having a representative particle diameter of approximately 10 ρm, the third filter aid is a diatomaceous earth having a representative particle diameter of approximately 20 μm to 40 μm, and the body feed filter aid is a diatomaceous earth having a representative particle diameter of approximately 20 μm.

According to this configuration, it is extremely inexpensive in terms of cost, a large quantity of raw water can be reliably sterilized to a high level of approximately 99% and, at the same time, a large quantity of raw water can be filtered in a short time.

A tenth illustrative embodiment of the present invention is dependent on the seventh illustrative embodiment, and provides the filtration apparatus characterized in that the raw water is water containing microorganisms in addition to foreign substances, the second filter layer filters out primarily bacteria, the third filter layer suppresses a formation of a filtration cake resulting primarily from phytoplankton of 5 μm to 10 μm size class and zooplankton of 10 μm to 50 μm size class, and the body feed layer suppresses the formation of the filter cake resulting primarily from the phytoplankton of 5 μm to 10 μm size class and the zooplankton of 10 μm to 50 μm size class.

According to this configuration, even when the raw water is water that contains microorganisms in addition to foreign substances, the second filter layer filters out primarily the bacteria, and the third filter layer prevents the plankton from sticking directly to the second filter layer. That is, the third filter layer suppresses the formation of the filter cake that result from the phytoplankton of 5 μm to 10 μm size class and the zooplankton of 10 μm to 50 μm size class to prevent the plankton from sticking to the fine particle layer of the second filter layer, which otherwise would cause can increase in pressure and reduction in flow rate. The body feed layer can suppress the formation of the filter cake on the third filter layer resulting primarily from the plankton of 10 μm to 50 μm size class, thereby allowing a prolonged continuous operation. Backwashing itself is easy, and the used filter aid can be reused. When compared with other types, it is extremely inexpensive in terms of cost. Equipments are reliable, practically applicable, simplified, and can be made compact.

An eleventh illustrative embodiment of the present invention is dependent on any one of the first to tenth illustrative embodiments, and provides the filtration apparatus characterized in that it is installed in a hull of a ship, and in that the filtration apparatus includes a water supply passage for pumping up seawater or freshwater, and a treated water passage adapted to be connected to a ballast tank, wherein the filtration apparatus filters the seawater or the freshwater and supplies ballast water.

According to this configuration, a large quantity of raw water can be sterilized to a high level of approximately 99% only with the physical treatment and, at the same time, a large quantity of raw water can be filtered in a short time, whereby a filter apparatus that meets the D2 ballast water discharge standard can be realized. When compared with other types, it is extremely inexpensive in terms of cost. Equipments are reliable, practically applicable, simplified, and can be made compact.

A twelfth illustrative embodiment of the present invention provides a filtration method including disposing a first filter layer of a first filter aid on an upstream side of a filter medium which is formed with openings, disposing a second filter layer of a second filter aid on an upstream side of the first filter layer, and carrying out a filtration by causing raw water to flow from a side of the second filter layer to the filter medium. The filtration method is characterized in that, the disposing the first filter layer includes selecting the first filter aid having a particle size distribution primarily including coarse particles, a representative particle diameter of which is smaller than a representative dimension of the openings, wherein, due to a flow during a water transfer, the particles are aggregated at the openings to cover and form bridges over said openings with multiple pieces, whereas the disposing the second filter layer includes selecting the second filter aid having a particle size distribution primarily including fine particles, which are smaller than the first filter aid and which themselves cannot form bridges over the openings, and in that the filtration method includes holding the first filter layer on the filter medium due to bridging phenomenon of the first filter aid, and adjusting the openings of the filter medium and the particles of the second filter layer in size by the first filter layer.

According to this configuration, the bridges of the first filter aid are formed at the openings of the filter medium, whereby the fine second filter aid which itself cannot form bridges at the openings can be held on the filter medium. Since the size adjustment of the second filter aid and the filter medium is performed by the first filter aid, a large quantity of raw water can be sterilized to a high level only with the physical treatment and, at the same time, a large quantity of raw water can be filtered in a short time. Both microfiltration and prevention of clogging can be achieved at the same time. A limit of the particle diameter of the first filter aid in respect to the prevention of the flowing away can be removed. Backwash itself is also easy and the filter aid used can be reused. Backwashing itself is easy, and the used filter aid can be reused. When compared with other types, it is extremely inexpensive in terms of cost. Equipments are reliable, practically applicable, simplified, and can be made compact.

A thirteenth illustrative embodiment of the present invention is dependent on the twelfth illustrative embodiment, and provides the filtration method characterized in that the disposing the first filter layer includes, given that the filter layer has the openings having the representative dimension d, selecting the first filter aid having the representative particle diameter defined as approximately (0.12 to 0.25)×d in accordance with a configuration of the openings.

According to this configuration, the first filter aid has the representative particle diameter defined as approximately (0.12 to 0.25)×d in accordance with a configuration of the openings. Therefore, the bridges of the first filter aid can be formed in accordance with the openings of the filter medium, whereby the fine second filter aid which itself cannot form bridges at the openings can be held on the filter medium. Since the eye adjustment of the second filter aid and the filter medium is performed by the first filter aid, a large quantity of raw water can be sterilized to a high level only with the physical treatment and, at the same time, a large quantity of raw water can be filtered in a short time. The limit of the particle diameter of the first filter aid in respect to the prevention of the flowing away can be removed. The first filter aid itself also contributes to the filtration.

A fourteenth illustrative embodiment of the present invention is dependent on the thirteenth illustrative embodiment, and provides the filtration method characterized in that the representative dimension d of the openings is 90 μm or larger.

According this configuration, the eyes of the filter medium and the first filter aid defined in accordance with the size thereof s can be prevented from becoming excessively small. Thus, an increase in the pressure loss can be suppressed, and deterioration of filtering function, which is caused when the eyes of the filter medium are excessively wide, can be prevented. A large quantity of raw water can be sterilized to a high level of about 99% only with the physical treatment and, at the same time, a large quantity of raw water can be filtered in a short time, whereby a filter apparatus that meets the D2 ballast water discharge standard can be realized. An interval time for backwashing is lengthened to about 10 times as compared with a conventional one, thereby enabling a prolonged continuous operation.

A fifteenth illustrative embodiment of the present invention is dependent on the fourteenth illustrative embodiment, and provides the filtration method characterized in that, if the openings are slits, and given that the representative dimension d is a gap in each of said slits, the representative particle diameter of the first filter aid has the particle diameter of approximately (0.20 to 0.25)×d.

According to this configuration, the first filter aid has the representative particle diameter defined as approximately (0.20 to 0.25)×d in accordance with of the configuration of the slits of the filter medium. Therefore, the bridges of the first filter aid can be formed in accordance with the openings of the filter medium such as a spring filter, whereby the fine second filter aid which itself cannot form bridges at the openings can be held on the filter medium. Since the eye adjustment of the second filter aid and the filter medium is performed by the first filter aid, a large quantity of raw water can be sterilized to a high level only with the physical treatment and, at the same time, a large quantity of raw water can be filtered in a short time. The limit of the particle diameter of the first filter aid in respect to the prevention of the flowing away can be removed. The first filter aid itself also contributes to the filtration.

A sixteenth illustrative embodiment of the present invention is dependent on the twelfth illustrative embodiment, and provides the filtration method characterized by including disposing one filter layer, or two or more filter layers sequentially, on the second filter layer, a particle diameter of a filter aid to be layered during which is equal to or larger than a particle diameter of the most upstream one of the already disposed filter layers.

According to this configuration, one layer or two or more layers of filter layers are disposed further on the upstream side of the second filter layer. Thus, the possibility of clogging in the filter layers can further be dispersed, thereby enabling a prolonged continuous operation.

A seventeenth illustrative embodiment of the present invention is dependent on the twelfth illustrative embodiment, and provides the filtration method characterized by including supplying a body feed filter aid to the second filter layer by mixing the body feed filter aid into the raw water during the filtration of the raw water, and forming a body feed layer on a further upstream side of the second filter layer by the supplying to suppress an increase in a pressure loss in the filter layers.

This configuration prevents a formation of filter cakes on the upstream side of the second filter layer, which otherwise would cause a clogging and a loss of capability to filter a large quantity of raw water in a short time, thereby enabling a continuous operation for a long time.

An eighteenth illustrative embodiment of the present invention is dependent on the sixteenth illustrative embodiment, and provides the filtration method characterized by including supplying a body feed filter aid, a particle diameter of which having a size equivalent to zooplankton, to the most upstream filter layer by mixing the body feed filter aid into the raw water during the filtration of the raw water, and forming a body feed layer on a further upstream side of said filter layer by the supplying to suppress an increase in a pressure loss in the filter layers.

This configuration can suppress the formation of the filter cake on the third filter layer resulting primarily from the plankton of 10 μm to 50 μm size class, thereby allowing a prolonged continuous operation. Backwashing itself is easy, and the used filter aid can be reused. When compared with other types, it is extremely inexpensive in terms of cost. Equipments are reliable, practically applicable, simplified, and can be made compact.

Embodiment 1

Figure 3:
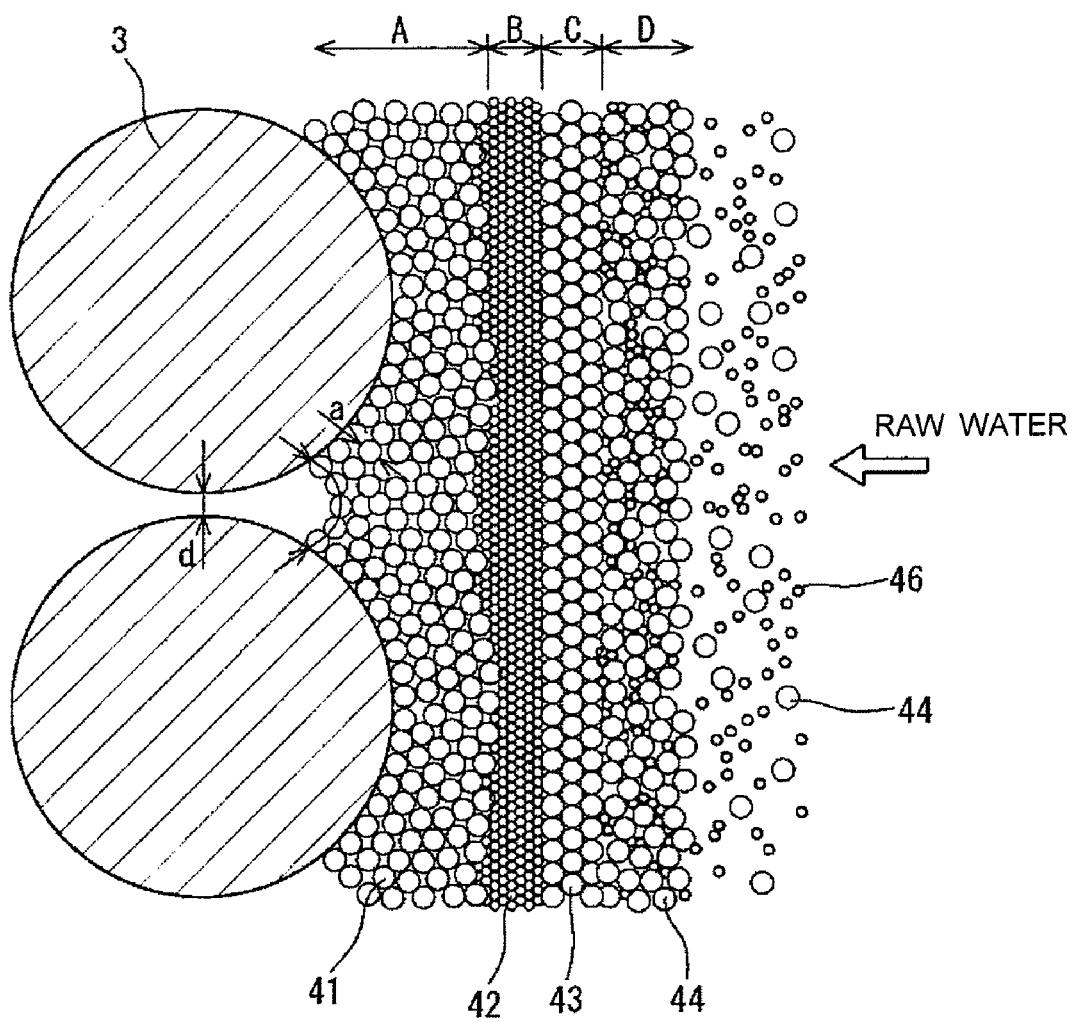
FIG. 3 is an explanatory view of a filtration in the filtration apparatus according to the embodiment 1 of the present invention.
Figure 4A:
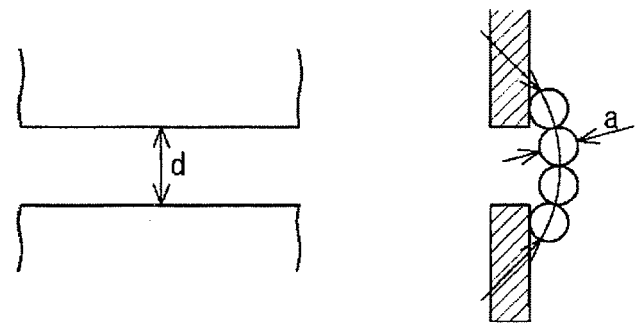
FIG. 4A is an explanatory view of a bridging in a case of having infinitely long slits.
Figure 4B:
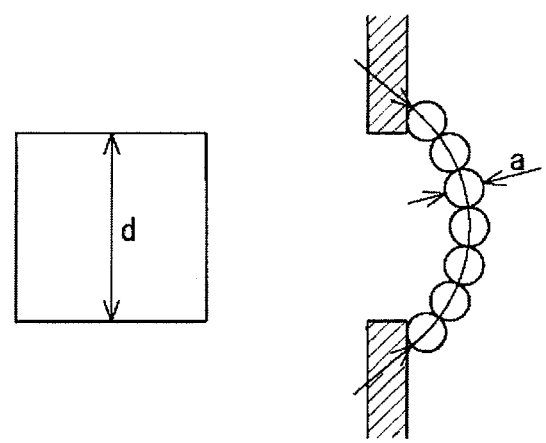
FIG. 4B an explanatory view of a bridging in a case of having square orifices.
Figure 4C:
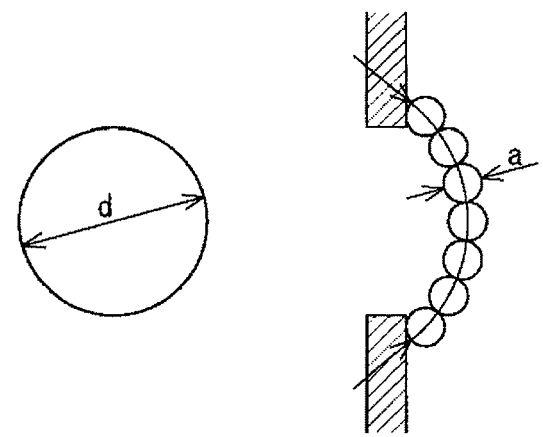
FIG. 4C is an explanatory view of a bridging in a case of having circular orifices.
Figure 5:
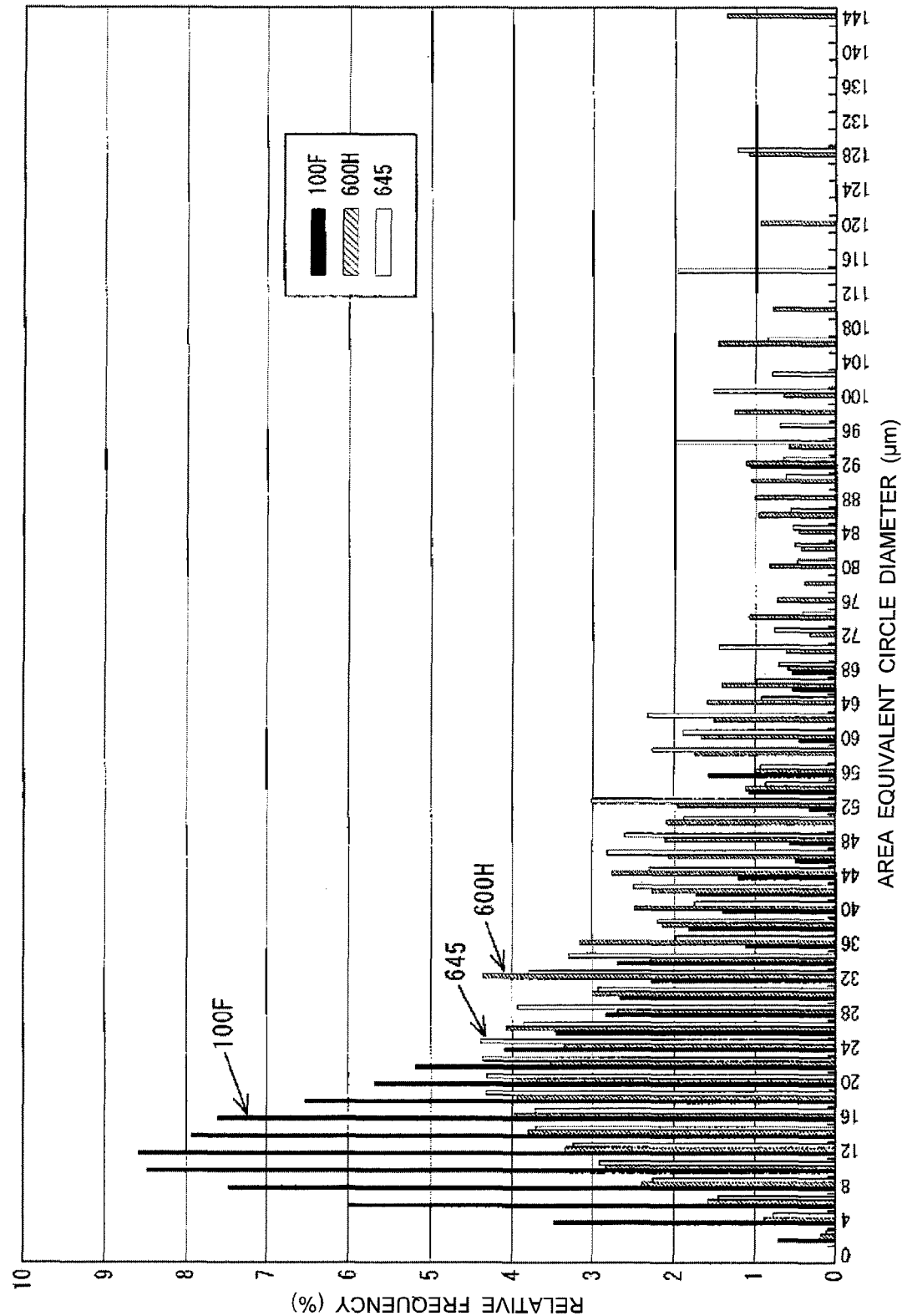
FIG. 5 is an explanatory diagram of a particle size distribution of calcined diatomite obtained by image analysis using a scanning electron microscope.
Figure 6:
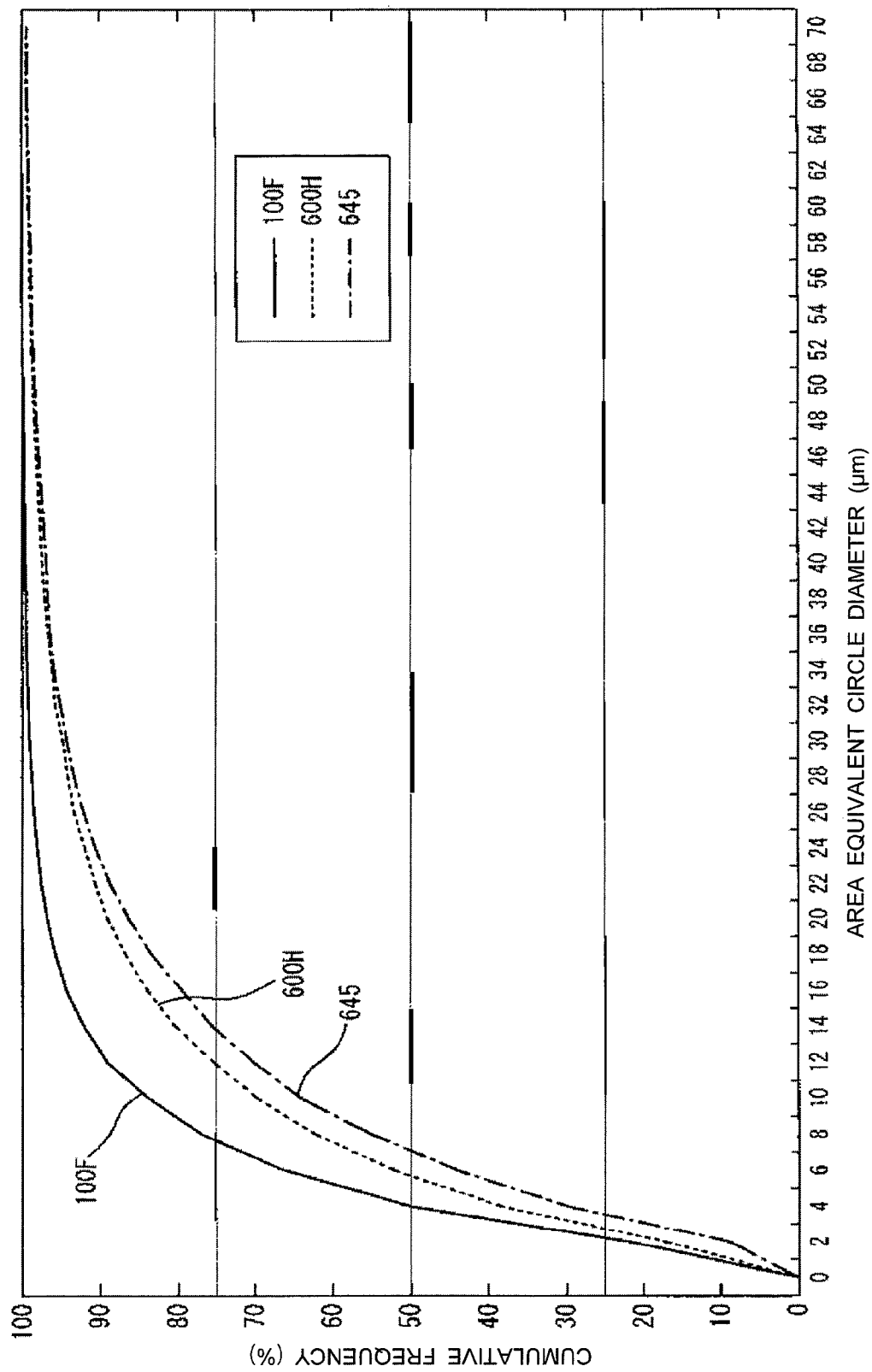
FIG. 6 is an explanatory diagram of the particle size distribution of the calcined diatomite.
Figure 7:
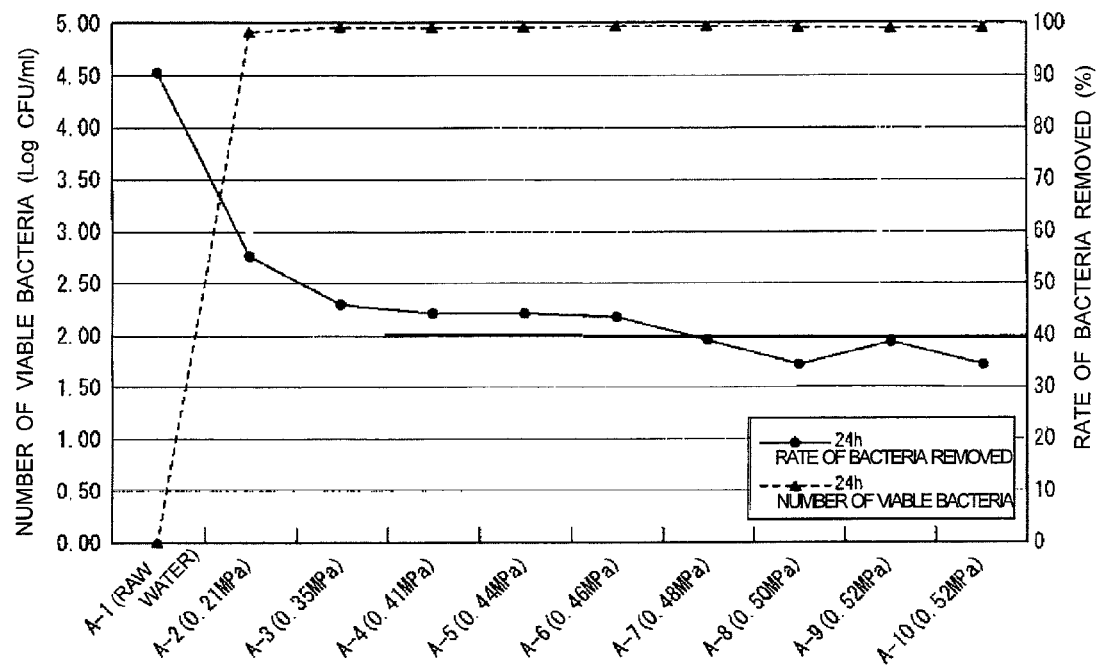
FIG. 7 is an explanatory diagram of a result of a first experimental result, showing sterilization effect of the filtration apparatus according to the embodiment 1 of the present invention.
Figure 8A:
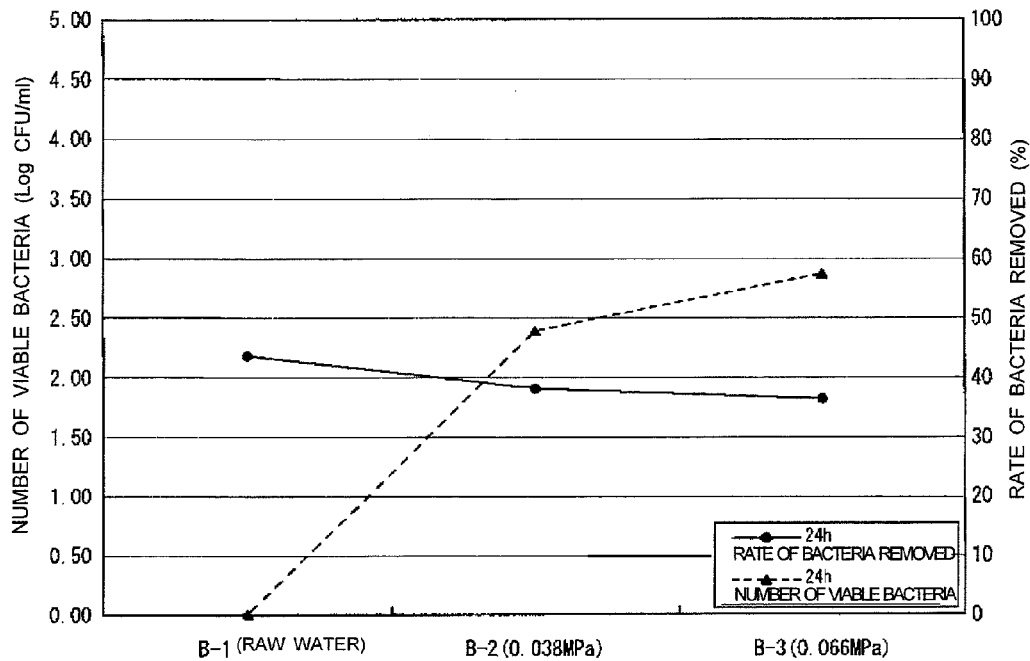
FIG. 8A is an explanatory diagram of an experimental result, showing sterilization effect of a comparative example.
Figure 8B:
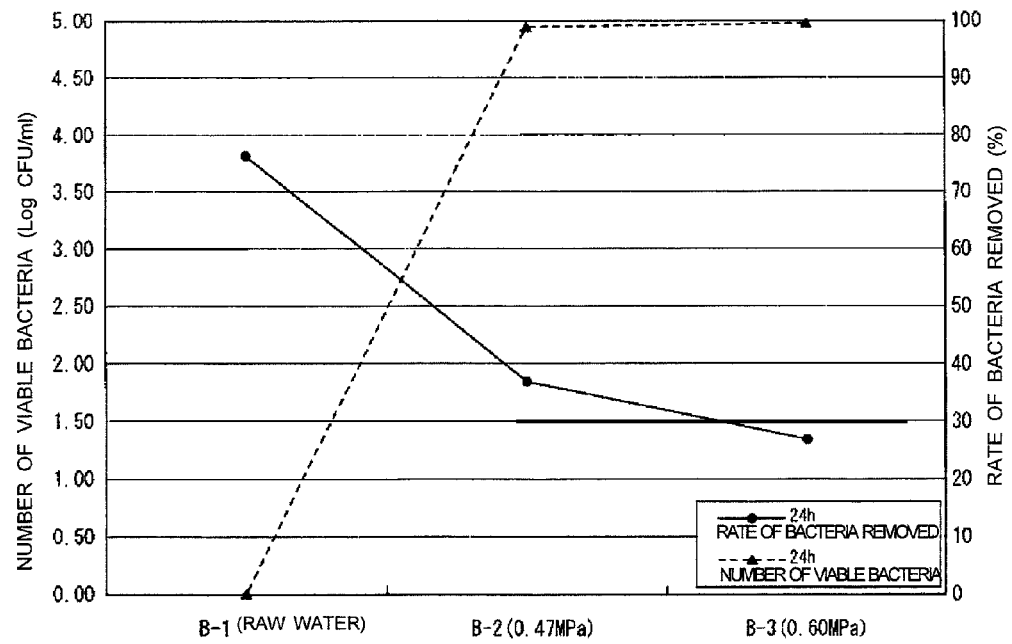
FIG. 8B is an explanatory diagram of a second experimental result, showing sterilization effect of the filtration apparatus according to the embodiment 1 of the present invention.
Figure 9:
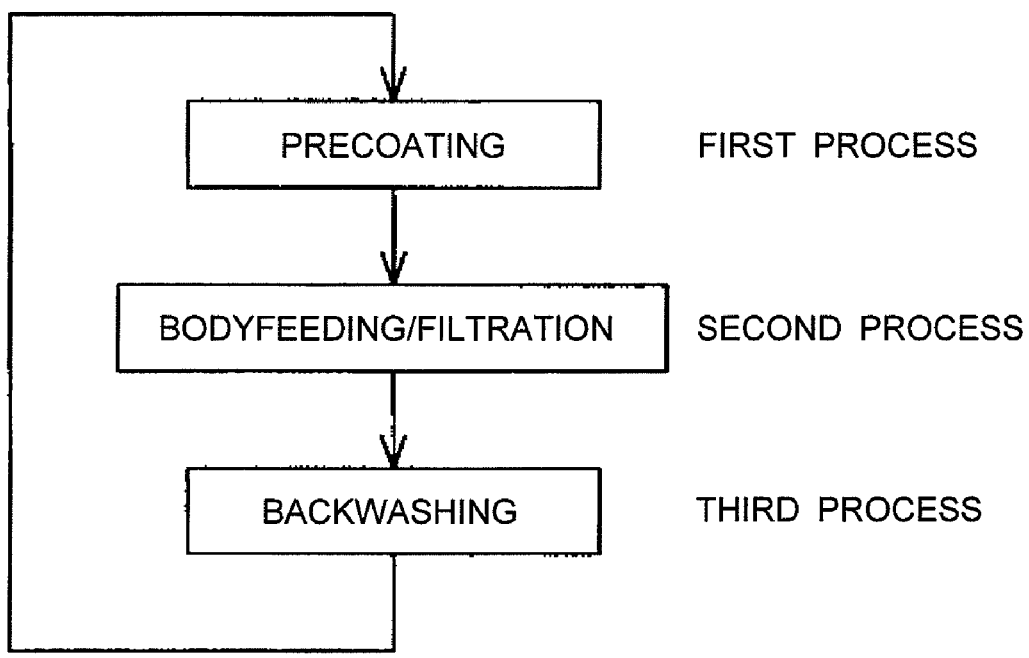
FIG. 9 is a flowchart of a filtration method according to the embodiment 1 of the present invention.

Hereinafter, a filtration apparatus and a filtration method according to an embodiment 1 of the present invention will be described. Water to be treated in the embodiment 1 of the present invention is ballast water. FIG. 1 is an explanatory diagram of a filtration apparatus according to an embodiment 1 of the present invention, FIG. 2A is an enlarged view of a relevant part of a spring filter of the filtration apparatus according to the embodiment 1 of the present invention, FIG. 2B is an exploded view of the spring filter of the filtration apparatus according to the embodiment 1 of the present invention, FIG. 3 is an explanatory view of a filtration in the filtration apparatus according to the embodiment 1 of the present invention, FIG. 4A is an explanatory view of a bridging in a case of having infinitely long slits, FIG. 4B an explanatory view of a bridging in a case of having square orifices, FIG. 4C is an explanatory view of a bridging in a case of having circular orifices, FIG. 5 is an explanatory diagram of a particle size distribution of calcined diatomite obtained by image analysis using a scanning electron microscope, FIG. 6 is an explanatory diagram of the particle size distribution of the calcined diatomite, FIG. 7 is an explanatory diagram of a result of a first experimental result, showing sterilization effect of the filtration apparatus according to the embodiment 1 of the present invention, FIG. 8A is an explanatory diagram of an experimental result, showing sterilization effect of a comparative example, FIG. 8B is an explanatory diagram of a second experimental result, showing sterilization effect of the filtration apparatus according to the embodiment 1 of the present invention, and FIG. 9 is a flowchart of a filtration method according to the embodiment 1 of the present invention.

Figure 2A:
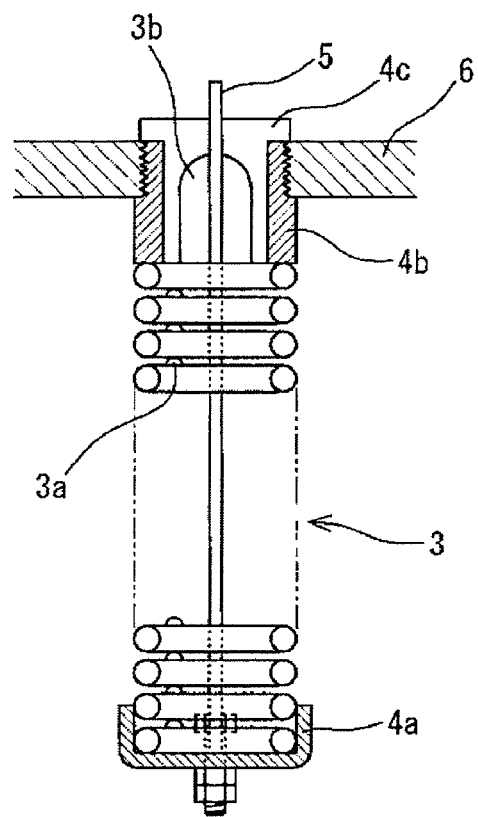
FIG. 2A is an enlarged view of a relevant part of a spring filter of the filtration apparatus according to the embodiment 1 of the present invention.
Figure 2B:
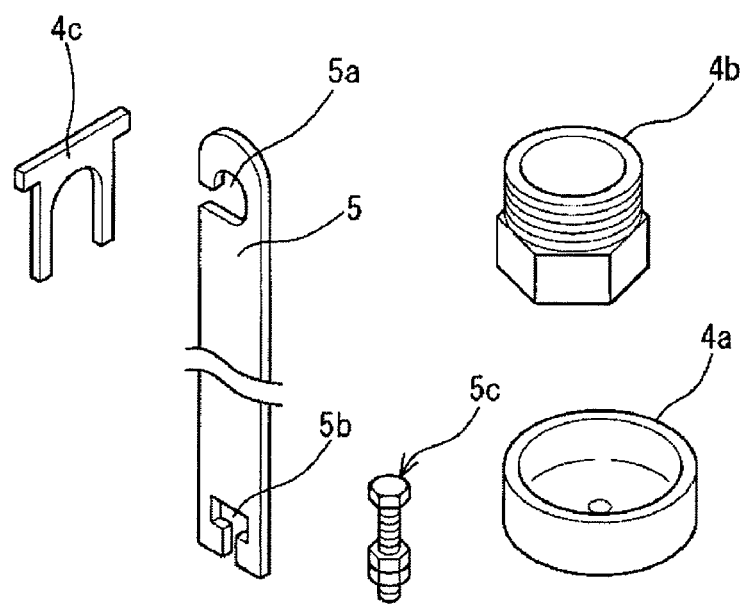
FIG. 2B is an exploded view of the spring filter of the filtration apparatus according to the embodiment 1 of the present invention.

As shown in FIGS. 1, FIGS. 2A and 2B, when raw water (hereinafter, also referred to as water to be treated) flows into a filter tank 1, the water to be treated is filtered by a plurality of spring filters 2 arranged thereinside, and the treated water that is filtered is discharged. On surfaces of each of the spring filters 2, multiple of pre-filter layers are formed. Each of the spring filters 2 is configured in the following manner.

That is, as shown in FIG. 2A, the spring filter 2, is configured from a coil spring 3 produced by spirally winding a wire having a substantially circular section. The coil spring 3 is formed with protrusions 3a having a height of about 60 μm to 120 μm at given intervals in a longitudinal direction thereof. Owing to the protrusions 3a, when the coil spring 3 is tightly wound, gaps (slits) each having a filter function and in which single winding spacing (1 pitch) is about 60 μm to 120 μm, preferably, about 90 μm to 120 μm in an axial direction of the coil are formed. Filtration can be carried out by causing the raw water to flow through the gaps. Because the respective ends of the coil spring 2 will be closed, the gaps become very narrow openings. When each of the gaps is 40 μm or smaller, the pressure loss becomes excessively large. Therefore, it is suitable that the gap be wider than at least 40 μm. However, when the gap is wider than necessary, particles of a filter aid pre-coating need to be large, which lowers the filter function as a whole. Therefore, it is preferable that the gap be 90 μm or larger, about 90 μm to 120 μm.

Next, a fixing member 4b, which is shown in FIGS. 2A and 2B and is provided on the upper end of the coil spring 3, is formed with a through opening 3b for discharging the treated water that has been filtered by the spring filter 2. The fixing member 4b is a member for mounting the coil spring 3 onto a partition plate 6 to configure the spring filter 2 and, as shown in FIG. 2A, is a bolt-like member formed with the through opening 3b at central portion thereof for running the water therethrough. On the outer periphery of the fixing member 4b, a male thread is carved. The male thread is threadedly engaged with a female thread formed in the partition plate 6, whereby the spring filter 2 is mounted onto the partition plate 6.

Into the through opening 3b of the fixing member 4b, leg portions of a plate-shaped and substantially Π-shaped engagement piece 4c is inserted from the screw side of the fixing member 4b so as to be in close contact with the inner surface thereof, whereby a head portion of the engagement piece 4c forms a bridge across the through opening 3b and is engaged with the partition plate 6 at protruded portions on the respective sides and the leg portions. An engagement groove 5a of a core member 5 made of a elongated plate is hooked on the upper end of the engagement piece 4c, whereby the head portion of the engagement piece 4c is engaged at a given position in the engagement groove 5a. Accordingly, the engagement piece 4c and the core member 5 are combined together in such a manner that, when viewed from above, two plates cross each other, and are mounted onto the partition plate 6. The engagement groove 5a is arranged near the upper end of the core member 5, and is formed as an L-shaped groove.

When the core member 5 is supported on the fixing member 4b in this manner, the core member 5 is held in such a manner that it is hung down from the engagement piece 4c and, therefore, the coil spring 3 is fitted therearound from below (an upstream side). A lower end portion of the core member 5 is formed with a T-shaped cut 5b and, next, a head portion of a fastener 5c is inserted into the cut 5b. The fastener 5c has a bolt and two nuts. A threaded portion of the bolt of the fastener 5c that is inserted into the cut 5b is projected from the insertion hole of the cap member 4a, the cap member 4a is pushed in and is fastened with the nuts, whereby the spring filter 2 is assembled in which the coil spring 3 is held between the cap member 4a and the fixing member 4b. Here, because the fastener 5c uses double nuts for fastening, there is no looseness and watertight fastening can be carried out. Thus, water leakage does not occur.

As shown in FIG. 1, the partition plate 6 separates the interior of the filter tank 1 in two to form a treated water chamber 1b on an upper side and a raw water chamber 1a on a lower side. The partition plate 6 is formed with insertion holes each having the female thread as shown in FIG. 2A, so as to correspond to the number of the spring filters 2. The male threads of the fastening members 4b of the respective spring filters 2 are threadedly engaged into the corresponding insertion holes and are attached in a watertight manner. Accordingly, only the through opening 3b is the portion that communicates the treated water chamber 1b and the raw water chamber 1a. Since the fastening member 4b is threadedly engaged with the partition plate 6 and the core member 5 is supported via the engagement piece 4c, the spring filter 2 is easy to assemble, can reliably be fixed, and can ensure watertightness.

Next, the entire configuration of the filtration apparatus will be described with reference to FIG. 1. The filtration apparatus according to the embodiment 1 is installed in a hull of a ship, and includes a water supply passage for pumping up seawater or freshwater, and a treated water passage adapted to be connected to the ballast tank. The filtration apparatus filters the seawater or the freshwater when pumping up or discharging the ballast water. Raw water is temporality stored in a raw water tank 10 provided in the water supply passage or is taken in directly from the sea chest of the ship hull, and is fed to the filter tank 1 by a pump 17 through a valve 29 and a check valve 35. In the filtering/sterilizing operation, the treated water, that has been filtered and sterilized by the filter tank 1, is fed to a treated water tank 12 via a three-way valve 20 and is stored therein.

On the surface of the spring filter 2 of the filtration apparatus, as shown in FIG. 3, multiple precoat layers, namely, according to the embodiment 1, a first precoat layer A, a second precoat layer B and a third precoat layer C are formed. Also, in order to suppress a pressure loss in the entire filtration apparatus and to prevent clogging in the respective layers, a body feed filter aid 44 is mixed into the raw water and is supplied, whereby a body feed layer is formed on the third precoat layer C.

To form the respective precoat layers, suspensions of filter aids for precoating, which are produced by mixing powders of filter aids 41, 42, 43 for precoating into clean water (or treated water or raw water), respectively, are sequentially supplied to the spring filter 2. The respective aid suspensions are prepared in a precoat tank 11 in the order of the filter aids 41, 42, 43, and are pressure fed from the precoat tank 11 by a pump 16 with the pressure of about 0.01 MPa to 0.03 MPa in the order of the first precoat layer A, second precoat layer B and third precoat layer C to precoat the surface of the spring filter 2. The filter aids 41, 42, 43 may be prepared in separate tanks, respectively, and supplied therefrom. The first precoat layer A, second precoat layer B and third precoat layer C may be provided through their individual passages, respectively.

The body feed layer D functions as a filter medium, in which the body feed filter aid 44 mixed into the raw water newly accumulates on the precoat layers, to catch fine particles 46 such as zooplankton, phytoplankton and fine dust to prevent the water path from being closed, whereby an increase in the pressure loss can be suppressed. As the body feed filter aid 44, an aid having a relatively large particle diameter that can remove zooplankton and the like is preferably used, and is prepared in advance by mixing into clean water, raw water or treated water stored inside the body feed tank 14. After the preparation, it is used by mixing it into the raw water while continuously stirring so that the body feed filter aid 44 does not precipitate.

With regard to the body feed layer D, when filtering the raw water, the filter aid suspension is pressure fed by the action of the pump 17 from the body feed tank 14 through a valve 31 and a check valve 36 with the pressure of about 0.2 MPa to 1 MPa, mixed into the raw water that is being transferred, and covers and accumulates on the surface of the precoat layer. Simultaneously with the accumulation, it catches the fine particles 46 such as zooplankton and phytoplankton as shown in FIG. 3. The zooplankton become highly viscous filter cake when clogged and, therefore, it has conventionally been regarded that it is difficult to take measures therefor. However, this problem can be solved by body feeding. Because the filter cakes are dispersed by the body feeding, the filter cakes are not formed in a concentrated manner due to the cake filtering phenomenon on the surface of the third precoat layer C.

While the third precoat layer C is provided in the embodiment 1 described above, the body feed layer D may be formed directly on the second precoat layer B, or other precoat layers of filter aids having a larger particles may further be disposed sequentially on the third precoat layer C. In the case of forming the other precoat layers, the body feed layer is disposed on an upstream of the most upstream one of the precoat layers. Owing to this body feed layer, an increase in a pressure loss (the concentrated formation of the filter cakes) in the most upstream side precoat layer is suppressed and, further and the pressure loss in the entire filtration apparatus, in other words, in the entire multiple precoat layers can be suppressed from increasing.

In some cases, only plankton are to be removed from raw water. In this case, as the second filter layer in the embodiment 1, the body feed layer D may be formed on the first precoat layer A. Although it is difficult to remove bacteria since the layer of the filter aid 42 is not formed, plankton and the like are removable. The first precoat layer A serving as the first filter layer is a necessary layer to carry out the eye adjustment between the filter aids, and is provided in order to adjust the eyes in connection with the second filter layer. This eye adjustment will later be described in detail.

The filter aid 41 of the first precoat layer A has particles of a specific particle diameter that enables the filter aid 41 to be held at the gaps of the coil spring 3 by itself. The reason for this will be given later. As the filter aid 41, it is preferable to use calcined diatomite or the like. As the filter aid 42 of the second precoat layer B, which is for removing bacteria of about 1 μm, it is also preferable to use calcined diatomite or the like. As the filter aid 43 of the third precoat layer C also, it is preferable to use calcined diatomite or the like. It filters out primarily phytoplankton of 5 μm to 10 μm size class and zooplankton of 10 μm to 50 μm size class. As the body feed filter aid 44 also, it is preferable to use calcined diatomite or the like.

Diatomaceous earth is a fossilized alga (phytoplankton) called diatom, which prospered on ancient earth several tens of thousands to several tens of millions years ago. The particles of calcined diatomite, which is produced by calcining the diatomaceous earth, has numerous pores of 0.1 μm to 1.0 μm. When the calcined diatomite is used as the filter aid, zooplankton and phytoplankton are caught between the particles, and bacteria such as a colon bacillus are taken in not only between the particles but presumably also into the numerous pores.

Here, characteristics required for particle diameters of the filter aids 41, 42, 443 and the body feed filter aid 44, respectively will briefly by explained. As for the filter aid 41 of the first precoat layer A, the relationship with the gaps of the coil spring 3 is important, and it is required to have a particle size distribution primarily including specific coarse particles which, due to a flow during a water transfer, aggregate at the gaps of the coil spring 3 such that multiple pieces thereof join together in the gaps. On the other hand, in order to filter out bacteria of about 1 μm, the filter aid 42 of the second precoat layer B has a particle size distribution which is smaller than the filter aid 41 and which themselves cannot form bridges over the gaps of the coil spring 3. As for the filter aid 43 of the third precoat layer C, ones having a representative particle diameter larger than that in the particle size distribution of the filter aid 42 are used. In the case of disposing further more precoat layers, particles of a size having a representative particle diameter which gradually increases than the filter aid 43 are used. The body feed filter aid 44 is required to have a particle size distribution of a particle diameter capable of preliminarily removing plankton, dust and the like before the raw water flows into the precoat layers, so a filter aid having a particle diameter corresponding their sizes is selected for the body feeding.

Next, respective flow passages of the filtration apparatus according to the embodiment 1 will be described with reference to FIG. 1. A flow passage connecting a clean water system to the valve 26, the precoat tank 11, the valve 27, the pump 16, the valve 28 and the check valve 34 is a precoat aid supply passage, and a flow passage connecting the clean water system to the valve 25, the body feed tank 14, the valve 31 and the check valve 36 is a body feed supply passage. The body feed supply passage supplies the filter aid suspensions to the raw water by driving the pump 17. In the embodiment 1, the body feed supply passage and the precoat aid supply passage are separately configured, however, the configuration of the body feed supply passage may be shared with the precoat aid supply passage.

Also, instead of the flow passages connected to the clean water system as described above, the precoat aid supply passage may be configured as a flow passage which supplies treated water and includes the three-way valve 20, the valve 22, the precoat tank 11, the valve 27, the pump 16, the valve 28 and the check valve 34, and the body feed supply passage may be configured as a flow passage which supplies treated water and includes the three-way valve 20, the valve 24, the body feed tank 14, the valve 31 and the check valve 36. Further, instead of the clean water and treated water flow passages, the raw water may be introduced into the precoat tank 11 and the filter aid suspensions for the precoating may be supplied to the raw water chamber 1a through a flow passage including the valve 27, the pump 16, the valve 28 and the check valve 34, and the raw water may be partially introduced into the body feed tank 14 and the filter aid suspensions for the body feeding may be mixed into the raw water in a flow passage including the valve 31 and the check valve 36.

Next, a backwash water supply passage will be described. A backwash water tank 13 is for storing backwash water which is used when performing backwashing. In the backwashing operation, the backwash water is fed by the pump 18 from the treated water chamber 1b side to the raw water chamber 1a side via the valve 30 and the check valve 36. The backwash water flows from the first precoat layer A side into the multiple precoat layers and washes away the filter cakes on the second precoat layer B, the third precoat layer C and the body feed layer D. The backwash water after the backwashing operation is stored into a sludge tank 15 as sludge through the valve 32. A blower 19 is provided in the filtration apparatus, so that air can be supplied into the raw water chamber 1a of the filter tank 1 through a gas valve 21 and the check valve 37 during the backwashing operation. The air sent from the blower 19 is injected from below the raw water chamber 1a and ascends as numerous air bubbles, and peels and drops off the diatomaceous earth and the filter cakes stuck onto the inner surface of the coil spring 3 from the inner surface by buoyant force of the bubbles. The backwash water supply passage may also use a flow passage for supplying the treated water from the three-way valve 20 and the valve 23 as the backwash water, or a flow passage for introducing the raw water to the backwash water tank 13 may be provided to supply this as the backwash water. Further, the used filter aid can be reused.

The characteristic configurations of the present invention in the filtration apparatus and the filtration method according to the embodiment 1 will be described. In order to filter out even the bacteria, it is necessary to carry out filtration using a filter medium having very fine eyes. However, a large quantity of raw water cannot be filtered in a short time merely by using such a filter medium. Clogging will soon occur, which makes continuous operation difficult.

In a case in which a spring filter 2 having relatively large eyes is used as a filter medium, for microfiltration, it is required to be pre-coated with a filter aid, and a particle diameter of the filter aid for the pre-coating the large eyes is required to be large in proportion to the eyes of the spring filter 2. Therefore, it has been believed that there is a limit in the reduction of the particle diameter of the filter aid, an increase in the pressure loss needs be suppressed.

That is, the particle diameter needs be small in order to filter out to a bacteria level, however, the fine filter aid flows away from the gaps of the spring filter 2 and thus cannot be maintained as a precoat layer. If the eyes of the spring filter 2 are reduced down to narrow the gaps in order to avoid this, the pressure loss becomes high, which disables a filtration of a large quantity of raw water in a short time such as several thousands of tons/hour. It is difficult to solve such mutually contradictory problems at the same time. This has been one of reasons why a filtration apparatus that physically sterilizes ballast water or the like did not exit.

However, in the embodiment 1, such contradiction is solved by the following means. That is, in a case in which the filter aid and the eyes of the filter medium (the openings having filtering function, i.e., gaps, pores, meshes, slits, etc.) do not match such that the former is too small to be held by the latter, measures are taken to interpose eye adjusting means for adjusting the sizes of the two. And a filter aid is used as this eye adjusting means. That is to say, eye adjusting function is separated from the function of the filter aid for filtering.

More specifically, the gaps of the spring filter 2 is widened, and is pre-coated with a filter aid 41 having a size which, when multiple filter aids are linked together, form bridges themselves over the gaps. Further, in order to thoroughly carry out sterilization, an aid having a specific fine particle diameter is used as the filter aid 42 of the second precoat layer B. Further, a filter aid 43 having a particle diameter that does not clog the second precoat layer B is used in the third precoat layer C, which is to be disposed on the second precoat layer B.

If an attempt is made to layer the fine filter aid 42 directly on the spring filter 2 shown in FIG. 3, the gap thereof is too wide that the filter aid 42 flows away along with the flow. However, when pre-coated with the filter aid 41 having a specific particle diameter, a plurality of the filter aids 41 link together in an arc form and builds a bridge over the eye of the filter medium, whereby they themselves support their own layer and the upstream layers, which makes the layered state possible to be maintained.

In a case in which a filter medium is a flat plate as shown in FIG. 4A and a slit is formed therein (wherein a spacing in the slit is "d"), and a representative particle diameter of the filter aid 41 is "a", when a value of approximately $a/d=0.25$ or more is given in respect to the particle diameter of the filter aid 41, the filter aids 41 aggregate at the slit along with the flow and, in the course of aggregation, a plurality of, about four, particles spontaneously link and work together, and form an arched bridge over the slit. In a case in which $a/d>1$, the eyes of the filter medium are likely to be closed if $a/d$ has a value of approximately 1, and if $a/d$ is larger than the value of approximately 1, the gaps between the particles becomes larger so the small filter aid 42 cannot be held as a filter layer and is caused to flow away. This is not suitable as a precoat layer for the eye adjustment. Therefore, it is preferable that at least $a/d$ be smaller than approximate range of 1 ($a/d<1$). Further, in order to enhance the sterilizing function by making the diameter of the filter aid 42 as small as possible, it is preferable that the particle diameter of the filter aid 41 for holding the filter aid 42 be as small as possible, and in the range of $a/d<1$, it is preferable that the filter aid 41 be a filter aid having a representative particle diameter that makes $a/d=$approximately 0.25.

If a value smaller than the approximate value of $a/d=0.25$ is given, the bridge cannot be formed. The filter aid 41 flows away along with the flow. When the representative particle diameter that makes aid=approximately 0.25 is given, about four or five of the filter aids 41 form a bridge over the slit. If the filter aid 41 has a particle diameter that makes $a/d=$exceeding 0.25, a bridge is formed over the slit with a fewer number.

Here, the approximate value has a range in which $a/d$ varies about ±0.02. Filter aids are uneven in shape, and have a particle size distribution in which the tendency is the same but there are slight individual differences. Therefore, even when a range or a value of a certain parameter (in this case, $a/d$) are the range or the value that is central to provide a specific operation and effect, the range or the value that provides the operation and the effect varies in accordance with the individual differences of the filter aids. The lower limit of the range where $a/d$ is preferable also varies about ±0.02, and in the vicinity of this range, there appears an approximate region which shows almost uniform operation and effect. This similarly applies to all of the other filter mediums and the filter aids which will be described below.

Explaining this the case of the bridge formation, while $a/d=0.25$ is the lower limit value that provides the operation and the effect, since the filter aids are uneven in shape and have a particle size distribution which is not always the same, the representative particle diameter a varies about 2 μm. In this case as well, a phenomenon like a bridge formation occurs. In other words, since the spacing d in the slit is almost about 100 μm, the lower limit of $a/d$ varies about ±0.02. Therefore, setting a threshold value as $a/d=$about 0.25 suffices in most cases, depending on the filter aids, there is a case where one of values within $a/d=(0.25-0.02)$ to $(0.25+0.02)$ becomes the lower limit value. As described above, the approximate value used in the present description means a value that ranges near a certain value or a certain range and provides also equivalent operation and effect almost as the certain value or certain range.

When the slits of the spring filter 2 are used, because the coil has a circular section as shown in FIG. 3, slightly differently from the case of the flat plate, an arched bridge is formed even when a value of $a/d=$approximately 0.2 or greater is given. If $a/d=$smaller than approximately 0.2, the bridge cannot be formed. In this case also, situations where $a/d>1$ are unsuitable. It is preferable that the particle diameter of the filter aid 41 which holds the filter aid 42 be as small as possible, and that a filter aid that makes $a/d=$approximately the lower limit value of 0.2.

In the case of the spring filter 2, about five particles can form a bridge over the gap. However, when the number of filter aids 41 capable of forming a bridge decreases (the particle diameter increases) so $a/d$ becomes approximately 1, the eyes of the filter medium become likely to be closed, in which case the pressure loss increases, clogging occurs in a short time, and a continuous operation becomes difficult. Further, when $a/d$ becomes larger than approximately 1, the gaps between the particles become larger, whereby the occurrence of clogging reduces. However, the eye adjustment becomes difficult.

Therefore, when the eyes of the filter medium are the slits of the flat plate, it is preferable that the filter aid is given a representative particle diameter that makes $a/d=$approximately 0.25. Further, when the slits are the gaps of (the coil having a circular cross section) of a spring filter, it is preferable to give a representative particle diameter that makes a/d=approximately 0.2. While there are various types of slits, a filter medium like a flat plate or a cross sectional configuration of a coil, a bridge can be formed at least by setting a representative particle diameter a of a filter aid to have a particle diameter that makes a/d=approximately 0.20 to 0.25. By selecting such a particle diameter, the bridge is formed, a filter aid of a small particle diameter having a good sterilization performance can be held, a pressure loss can be suppressed, clogging does not occur in a short time, and a continuous operation becomes possible.

In a portion where the first precoat layer A and second precoat layer B are in contact, the small filter aid 42 moves into the gaps and uneven portions between the filter aids 41, whereby a condition in which they are mixed together is created. Due to this mixture, the eyes of the filter aid 42 and the eyes of the filter aid 41 do not shift in size at once, but the eyes of the filter medium gradually change in the mixed range, which prevents filter cakes that can be formed due to the sudden change of fluid resistance, and delays clogging.

FIG. 4A shows a bridging in the case described above in which the filter medium has the slit of an infinite length. In contrast, FIG. 4B shows a bridging in a case in which a filter medium has a square orifice consisting of four sides each having a finite length. In this case, if a representative particle diameter makes a/d=approximately 0.15 or greater, a bridge is formed as shown in FIG. 4B. Specifically, a dome-shaped bridge is formed with about six or seven particles. In this case also, it is not situations where a/d>1 are unsuitable. If a value that makes a/d=smaller than approximately 0.15 is given, the bridge is not formed. The filter aid flows away along with the flow. When the number of filter aids capable of forming a bridge decreases (the particle diameter increases) so a/d becomes approximately 1, the eyes of the filter medium become likely to be closed, in which case the pressure loss increases, clogging occurs in a short time, and a continuous operation becomes difficult. Further, when a/d becomes larger than approximately 1, the occurrence of clogging reduces, but the eye adjustment becomes difficult. It is preferable that the particle diameter of the filter aid be smaller to hold a small filter aid having good sterilization performance. Therefore, when the eyes of the filter medium are square orifices, it is preferable that the filter aid be given a representative particle diameter that makes a/d=approximately 0.15.

Similarly, when the eyes of the filter medium are circular orifices as shown in FIG. 4C, a dome-shaped bridge is formed if a representative particle diameter makes a/d=approximately 0.14 or greater. Specifically, the dome-shaped bridge is formed with about six or seven particles. In this case also, when a/d>1, the representative particle diameter is unsuitable for the eye adjustment. If a/d=smaller than approximately 0.14, the bridge is not formed. The filter aid flows away along with the flow. When a/d becomes the approximate value of 1, while the number of filter aids for forming a bridge decreases, the pressure loss increases, clogging occurs in a short time, and a continuous operation becomes difficult. When it becomes larger than approximately 1, the eye adjustment becomes unsuitable. It is preferable that the particle diameter of the filter aid be smaller to hold a small filter aid for sterilization. Therefore, when the eyes of the filter medium are circular orifices, it is preferable that the filter aid be given a representative particle diameter that makes a/d=approximately 0.14.

As described above, the particle diameter distribution of the filter aid made of diatomaceous earth has a variation of about 2 μm as a variation of a mode value showing the greatest frequency. Further, there is a characteristic in a distribution around the mode value, where it has same level of values in the range of about ±2 μm from the center (see "645" and "600H" in FIG. 5), that is, there is tendency to show a flatly spread distribution around the greatest frequency. Therefore, depending on the filter aids, a/d=approximately 0.12 or greater suffices for a bridge formation.

In a case in which a configuration of eyes of a filter medium is intermediate between a slit and an orifice such as elliptical or rectangular, or in a case in which various configurations of eyes of a filter medium are mixed, it becomes close to a/d=0.25 if the configuration is close to a slit, it becomes close to a/d=0.12 if the configuration is close to a circular orifice, it becomes close to a/d=0.25 if there are more numbers of configurations that are close to a slit, and it becomes close to a/d=0.12 if there are more numbers of configurations that are close to a circular orifice. Further, when a filter medium has a round cross section such as a spring filter, a/d=approximately 0.2 becomes a threshold value as to whether a bridge can be formed or not. Accordingly, the parameter a/d of the particle diameter of the filter aid can be selected from a/d=(0.12 to 0.25), depending on the configuration of the eyes (openings having a filtering function, that is, a gap, a pore, a mesh, a slit or the like) of the filter medium.

The spring filter 2 of the embodiment 1 has gaps larger than 40 μm. In order to enhance sterilization performance with a balance against pressure loss taken into consideration, the gaps are preferably 60 μm to 120 μm, favorably 90 μm to 120 μm. Therefore, the filter aid 41 of the first precoat layer A may have a size of about 18 μm to 24 μm. For the spring filter 2 having the gaps of 100 μm, a representative particle diameter of about 20 μm may be selected and, for the spring filter 2 of 90 μm, a representative particle diameter of about 18 μm may be selected. Nevertheless, in the case of 90 μm, a calcined diatomite having a representative particle diameter of 20 μm, which is slightly larger than 18 μm, may be used to reliably form a bridge. There is no difference in the pressure loss between the two, but a bridge formation becomes more reliable.

It is preferable that the filter aid 42 of the second precoat layer B be diatomaceous earth having a representative particle diameter of about 10 μm for sterilization, and the filter aid 43 of the third precoat layer C be diatomaceous earth having a representative particle diameter of about 20 μm to 40 μm. The third precoat layer C mainly prevents clogging from being caused by filter cakes which result from direct sticking of plankton to the second precoat layer B. More specifically, the third precoat layer C filters out phytoplankton of 5 μm to 10 μm size class and zooplankton of 10 μm to 50 μm size class to suppress the formation of the filter cakes resulting therefrom. The plankton are prevented from sticking onto the fine particle layer of the filter aid 42 of the second precoat layer B, which otherwise would increase pressure and reduce flow rate. Further, it is preferable that the body feed filter aid be diatomaceous earth having a representative particle diameter of about 20 μm. The body feed layer filters out plankton having a size exceeding 5 μm (the phytoplankton of 5 μm to 10 μm size class and the zooplankton of 10 μm to 50 μm size class) and foreign substances, thereby suppressing the formation of the filter cakes resulting from these plankton and reducing the pressure loss in the entire precoat layers.

As described above, according to the embodiment 1, the first precoat layer A which carries out the eye adjustment is provided, whereby the gap of the spring filter 2 can be widened and, also, even bacteria of about 1 μm can be filtered out with the second precoat layer B. The first precoat layer A, which carries out this eye adjustment, is made of the filter aid 41 having a particle diameter distribution primarily including coarse particle diameters, and the second precoat layer B to be disposed thereon is made of the filter aid 42 having a particle diameter distribution primarily including fine particle diameters to have a sterilization performance. Further, the third precoat layer C is a layer for preventing the second precoat layer B from being clogged in the course of filtration, and the body feed layer D is disposed thereon to prevent the entire of the precoat layers from being clogged.

Owing to cooperation between the multiple precoat layers, the body feed layer and the spring filter, sterilization and filtration of a large amount in a short time become possible. An interval time for backwashing is lengthened to about 10 times as compared with a conventional one, thereby enabling a prolonged continuous operation. Further, although it has been believed that there is a limit to reduce the particle diameter of the filter aid from the viewpoint of preventing the flowing away, the particle diameter can be reduced beyond this conventional limit. Only with the physical filtration, the sterilization of about 99% can be attained and can achieve the D2 ballast water discharge standard. Backwashing itself is easy, and the used filter aid can be reused. When compared with other types, it is extremely inexpensive in terms of cost. Equipments can be simplified and made compact. That is, it is possible to realize a filtration apparatus that is best suited for treating ballast water.

Example

In the embodiment 1, to measure its specific operations and effects, there was conducted a ballast water filtration test, using calcined diatomite (silica 600H/silica 645; manufactured by Chuo Silica Co., Ltd.) as the filter aids 41, 43 and the body feed filter aid 44, and using calcined diatomite (silica 100F; manufactured by Chuo Silica Co., Ltd.) as the filter aids 42. The gaps in the spring filter 2 are 90 μm.

FIG. 5 is a particle size distribution of calcined diatomite obtained by image analysis using a scanning electron microscope. FIG. 6 is a cumulative frequency of the same calcined diatomite. The particle diameter of the calcined diatomite is represented by an area equivalent circle diameter (μm) which is obtained when, based on an image, the area of a particle is converted to a circle. The particle diameters of the calcined diatomite of the filter aids 41, 43 and the body feed filter aid 44 (silica600H/silica645) used in the experiment all has mode values, which is the greatest frequencies, of approximately 20 μm, which means that 20 μm is their representative particle diameters. Further, the calcined diatomite (silica 100F) of the filter aid 42 used in the experiment has its mode value of approximately 10 μm, i.e., 10 μm its representative particle diameter.

According to the cumulative frequency of the calcined diatomite in FIG. 6, in a case of the calcined diatomite of the filter aid 42, about 98% of the particles are particles smaller than the particle diameter of 30 μm and, in a case of the calcined diatomite of the filter aids 41, 43 and the body feed filter aid 44, about 98% of the particles are particles smaller than the particle diameter of 50 μm. As shown in FIGS. 5 and 6, the particle diameter of the filter aid particles of the calcined diatomite does not have a distribution like a normal distribution, but has a distribution in which particles having a particle diameter larger than the greatest particle diameter are relatively widely included. When the diatomaceous earth is sintered, there is produced a sintered body in which the surface of the diatomaceous earth is fused and hardened, however, a size and particle configuration of the fused material vary depending on the sintering. This fusion is one of the reasons for the uneven particle diameters, and is considered to be one of the reasons that cause the particle distribution shown in FIGS. 5 and 6. Nevertheless, most of the calcined diatomite exists in the range of two to three times the representative particle diameter and, although there are slight differences depending on the sintering conditions or the like, a particle size distribution of most of the calcined diatomite basically become a distribution having such a tendency as shown in FIG. 5.

FIG. 7 shows an experimental result illustrating sterilization effect. FIG. 7 shows, not only that a prolonged continuous operation is made possible (the time period until the backwashing is lengthened to about 10 times as compared with conventional), and also that sterilization up to 99.5% is made possible. With regard to designations such as A-2 (0.21 MPa), A-1 designates a sample of raw water A, while numbers 2, 3, and the like of A-2, A-3, . . . , etc. are given as names of experiments respectively conducted on the sample A-1 and inside the parentheses are the] pressures inside the filter tank 1. That is the pressure near the partition plate 6 inside the raw water chamber 1a. The numbers of bacteria used in the experiments are counted by culturing the viable bacteria and are expressed by log. According to the experiments in FIG. 7, it is shown that the bacteria and the like can sufficiently be removed by transferring the water under the pressure of 0.2 MPa or higher. The pressure applied does not necessarily have to be a specially high pressure, a sufficient sterilization effect can be obtained even with a relatively low pressure. This demonstrates that D2 standard of the international convention described above, namely, the standard of less than 10 individuals/ton with respect to the number of plankton having a size of more than 50 μm in the ballast water of 1 ton, less than 10 individuals/1 ml with respect to the number of plankton of 10 μm to 50 μm, and less than 250 cfu (colony forming unit)/100 ml with respect to *Escherichia coli*, can be met only with the present filtration apparatus.

FIGS. 8A and 8B show a comparison of filtration experiments conducted on a sample B-1 of raw water B using the present example and a comparative example. In the comparative example, calcined diatomite (silica 600H) having a representative particle diameter of 20 μm was applied to a spring filter to carry out filtration. The treated water was cultured for 24 hours and the numbers of viable bacteria were checked. On the other hand, in the present embodiment, calcined diatomite (silica 600H) were used as the filter aids 41, 43 and the body feed filter aid 44 having a representative particle diameter of 20 μm, and calcined diatomite (silica 100F) was used as the filter aid 42 to carry out filtration. Similarly to FIG. 7, the pressures for filtration are described in the parentheses respectively. The gaps of the spring filter 2 are 90 μm. After culturing for 24 hours, the same check was carried out. According to this, it is shown that, in the case of the calcined diatomite of the comparative example, for both of 0.038 MPa and 0.066 MPa, the number of bacteria removed is only about 2.0 log CFU/ml and the bacteria removal rate is from 50% to 57%, whereas in the present example, with the pressure of 0.06 MPa, the number of bacteria removed is about 1.91 log CFU/ml and the bacteria removal rate reaches 99%. Here, the bacteria removal rate of 99% means that this result was obtained using the sample, the check environment and conditions described above, and there is a room left for an increase or a decrease when the sample, the check environment and conditions are changed. With this taken into account, it can be restated that, when the filtration apparatus of the embodiment 1 is used, the bacteria removal rate of about 99% can be realized.

As described above, in the filtration apparatus of the embodiment 1, only by providing multiple of precoat layers and by further forming the body feed layer, the bacteria removal rate of about 99% can be achieved. The time period until the backwashing can be lengthened to about 10 times as compared with conventional, thereby enabling a prolonged continuous operation.

Next, a filtration method according to the embodiment 1 will be described. As shown in FIG. 9, before the filtering operation, precoating treatment is carried out on the outer periphery of the spring filter 2. In this precoating treatment, the valves 26, 27, 28 are opened to connect to the clean water system. While the clean water system is described, it may be treated water or raw water.

In this state, the pump 16 is driven to mix the powdered filter aid 41 stored in the precoat tank 11 with the clean water using a stirrer and to inject them into the raw water chamber 1a of the filter tank 1, thereby forming the first precoat layer A. Next, the filter aid 42 is treated in the same procedure to form the second precoat layer B, and the filter aid 43 is also treated in the same procedure to form the third precoat layer C. According to these steps, the multiple precoat layers are formed (a first process). Thereafter, the three-way valve 17 is switched, and the treated water chamber 1b is connected to the treated water tank 12.

Next, the bodyfeeding/filtration process is carried out in which the filtration is carried out while bodyfeeding (a second process). The bodyfeeding/filtration process is carried out in the following manner. That is, a suspension for body feeding is prepared in advance by mixing the body feed filter aid 44 into the raw water stored in the body feed tank 14. After the preparation, the suspension is continuously stirred using a stirrer in order to prevent precipitation. When body feeding, the suspension is mixed into the raw water being supplied by the pump 17, and is injected into the raw water chamber 1a. Accordingly, the body feed layer D is formed on the first precoat layer A, the second precoat layer B and the third precoat layer C. Instead of the raw water, it may be mixed into the treated water.

The body feed layer D provides a filter medium, on which a filter aid 44 mixed into the raw water is newly accumulated, to catch plankton and the like, and prevents the filter cakes from being formed on the surface of the third precoat layer C to prevent the water passage (water channel) from being closed. This suppresses an increase in the pressure loss in the entire filtration apparatus. Plankton and bacteria contained in the raw water are removed through the multiple precoat layers and the body feed layer, and the treated water is introduced into the treated water tank 12.

Thereafter, when the pressure loss in the outer periphery of the spring filter 2 is increased, the backwashing is carried out (a third process). At this time, the clean water system or the backwash water stored through the valve 23 into the backwash water tank 13 is fed into the filter tank 1 by a pump 18 while opening the valve 30, and the is discharged by opening the valve 32. Thus, the filter cakes stuck in the filtration apparatus is washed back. As the backwash water, the raw water may be used also. Further, the valve 18 is opened and the blower 19 is driven to feed air into the filter tank 1.

The air fed by the blower 19 is injected as numerous air bubbles from below the raw water chamber 1a, due to the buoyancy of the air bubbles, the diatomaceous earth and the filter cakes in the first precoat layer A, the second precoat layer B, the third precoat layer C and the body feed layer D stuck to the inner surface of the coil spring 3 are peeled off from the inner surface of the coil spring 3, and the sludge is stored in the sludge tank 15. In a case in which the gap of the spring filter 2 is smaller than 60 μm, the compressed air may be injected from the treated water chamber 1b to push out the water remaining in the filter tank 1 from the treated water chamber 1b side of the coil spring 3 toward the raw water chamber 1a side.

Next, returning back again to the first process, the outer periphery of the spring filter 2 is again precoated. That is, the first precoat layer A is formed with the filter aid 41, the filter aid 42 is treated in the same procedure to form the second precoat layer B, and the filter aid 43 is also treated in the same procedure to form the third precoat layer C. The multiple precoat layers are again formed by this sequence of steps, and then, the bodyfeeding/filtration process is be carried out.

As described above, according to the filtration apparatus and the filtration method of the embodiment 1, the ballast water can be sterilized to a high level only using a physical treatment without using any chemical agent. Thus, the apparatus is reliable, practically applicable, continuously operable for a long time, and is excellent in the cost performance.

Owing to the cooperation between the multiple precoat layers, the body feed layer and the spring filter, even minute bacteria can be removed, a large quantity of raw water can be filtered in a short time, and the time period untile the backwashing can be lengthened to about 10 times as compared with the conventional, thereby enabling a prolonged continuous operation. Further, although it has been believed that there is a limit to reduce the particle diameter of the filter aid in order to prevent the flowing away, the particle diameter can be reduced beyond the conventional limit.

Sterilization of about 99% can be achieved only with the physical filtration, and can meet the D2 ballast water discharge standard. In addition to the capability of prolonged continuous operation, backwash itself is also easy and the filter aid used can be reused. Backwashing itself is easy, and the used filter aid can be reused. When compared with other types, it is extremely inexpensive in terms of cost. Equipments can be simplified and be made compact. The present filtration apparatus and the filtration method can filter out bacteria and foreign substances not only from the ballast water but also from any kinds of water to be treated.

INDUSTRIAL APPLICABILITY

The present invention is applicable to a filtration apparatus which can remove organisms in ballast water or the like to a level that meets the international environmental standard.

The invention claimed is:

1. A filtration apparatus comprising:
a filter medium which filters raw water through openings;
a first filter layer in which an upstream side of the filter medium is precoated with a first filter aid by bridging phenomenon in which multiple pieces of particles of the first filter aid are linked to form bridges; and
a second filter layer in which an upstream side of the first filter layer is precoated with a second filter aid,
wherein the first filter aid has a size which is smaller than the openings, and which, when the particles thereof are aggregated at the openings due to a flow during a precoating, enables the multiple pieces to be linked to form the bridges over said openings,
whereas the second filter aid has a size which is smaller than the first filter aid and which itself cannot form bridges over the openings,
wherein the openings of the filter medium and particles of the second filter aid are adjusted in size by the bridging phenomenon of the first filter aid, and the filtration apparatus causes the raw water to flow from a side of the second filter layer to the filter medium to carry out a filtration, and wherein, a third filter layer is provided in which an upstream side of the second filter layer is precoated with a third filter aid having a larger particle diameter than the second filter aid, wherein an increase in a pressure loss in the course of the filtration through the second filter layer is suppressed by the third filter layer.

2. The filtration apparatus according to claim 1, wherein, on an upstream side of the third filter layer, or, when a filter layer of a filter aid, particles of which increase in size sequentially, is further disposed on the third filter layer, on an upstream of said filter layer on the most upstream side, a body feed layer of a body feed filter aid is disposed, wherein an increase in a pressure loss in the entire filtration apparatus is suppressed by said body feed layer.

3. The filtration apparatus according to claim 2, wherein the filter medium is a spring filter including coil parts, the openings are gaps between the coil parts wherein the coil parts are wound, and the filter apparatus comprises:
   a precoat aid supply passage operable to supply, for precoating, one of the first to third filter aids and the filter aid of the further layer, respectively; and
   a body feed aid supply passage which supplies the body feed filter aid into the raw water.

4. The filtration apparatus according to claim 3, wherein each of the gaps is 60 μm to 120 μm, and the first filter aid, the second filter aid, the third filter aid, and the body feed filter aid are diatomaceous earth.

5. The filtration apparatus according to claim 2, wherein the raw water is water containing microorganisms in addition to foreign substances, the second filter layer filters out primarily bacteria, the third filter layer suppresses a formation of a filtration cake resulting primarily from phytoplankton of 5 μm to 10 μm size class and zooplankton of 10 μm to 50 μm size class, and the body feed layer suppresses the formation of the filter cake resulting primarily from the phytoplankton of 5 μm to 10 μm size class and the zooplankton of 10 μm to 50 μm size class.

6. The filtration apparatus according to claim 2, wherein the body feed filter aid has the same size as at least one of the first filter aid and the third filter aid.

7. The filtration apparatus according to claim 6, further comprising a tank from which the body feed filter aid and said at least one of the first filter aid and the third filter aid are supplied.

8. The filtration apparatus according to claim 1, wherein the first filter aid and the third filter aid have the same size.

9. The filtration apparatus according to claim 8, further comprising a tank from which the first filter aid and the third filter aid are supplied.

10. A filtration method comprising:
    selecting a first filter aid having a size which is smaller than openings of a filter medium, and which, when particles thereof are aggregated at the openings due to a flow during a precoating, enables multiple particles to be linked and form bridges;
    precoating an upstream side of the filter medium with a first filter layer of the first filter aid;
    selecting a second filter aid having a size which is smaller than the first filter aid and which itself cannot form bridges over the openings;
    precoating an upstream side of the first filter layer with a second filter layer of the second filter aid;
    adjusting the openings of the filter medium and particles of the second filter aid in size by bridging phenomenon of the first filter aid;
    carrying out a filtration by causing raw water to flow from a side of the second filter layer to the filter medium; and
    precoating the second filter layer with one filter layer, or two or more filter layers sequentially, a particle diameter of a filter aid for the precoating during which is larger than a particle diameter of the most upstream one of the already precoated filter layers.

11. The filtration method according to claim 10, further comprising:
    supplying a body feed filter aid, a particle diameter of which having a size equivalent to zooplankton, to the most upstream filter layer by mixing the body feed filter aid into the raw water during the filtration of the raw water; and
    forming a body feed layer on a further upstream side of said filter layer by the supplying to suppress an increase in a pressure loss in the filter layers.

* * * * *